Oct. 23, 1945. R. E. WHITMORE 2,387,312
PARKING VEHICLE ART AND APPARATUS
Filed Nov. 26, 1942 10 Sheets-Sheet 3

Roy E. Whitmore Inventor

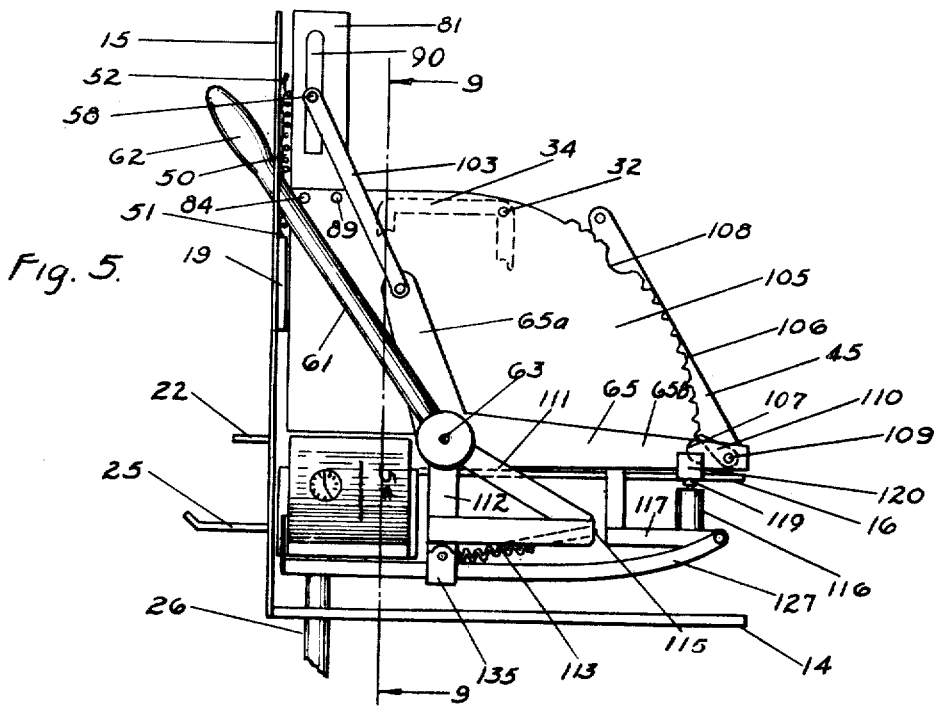
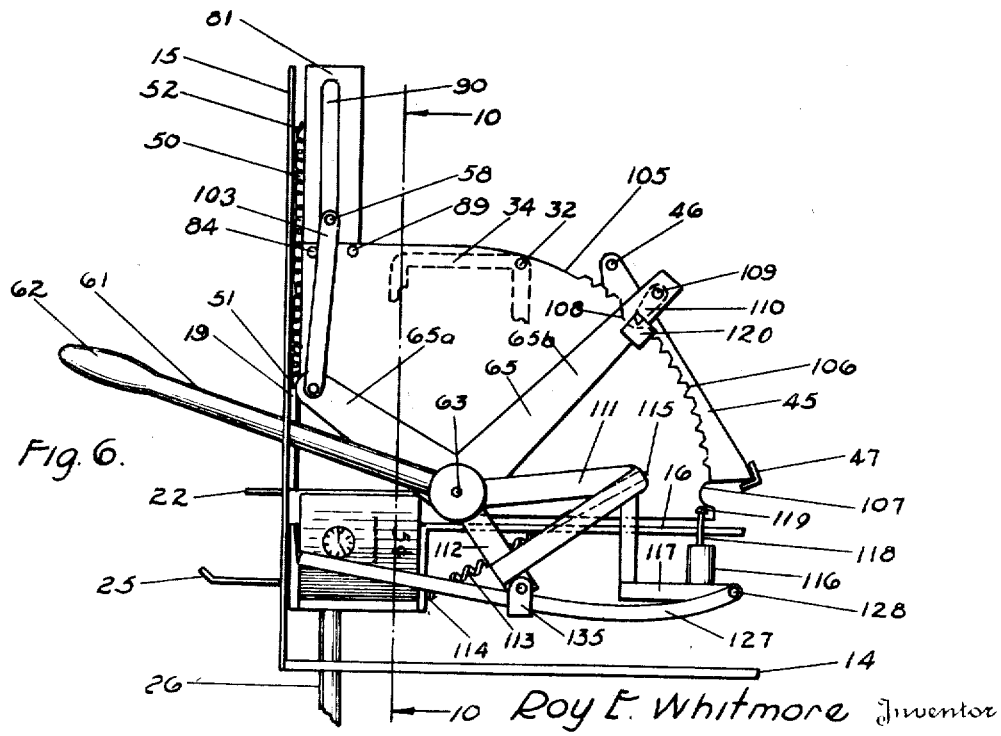

Roy E. Whitmore Inventor

Oct. 23, 1945. R. E. WHITMORE 2,387,312
PARKING VEHICLE ART AND APPARATUS
Filed Nov. 26, 1942 10 Sheets-Sheet 6
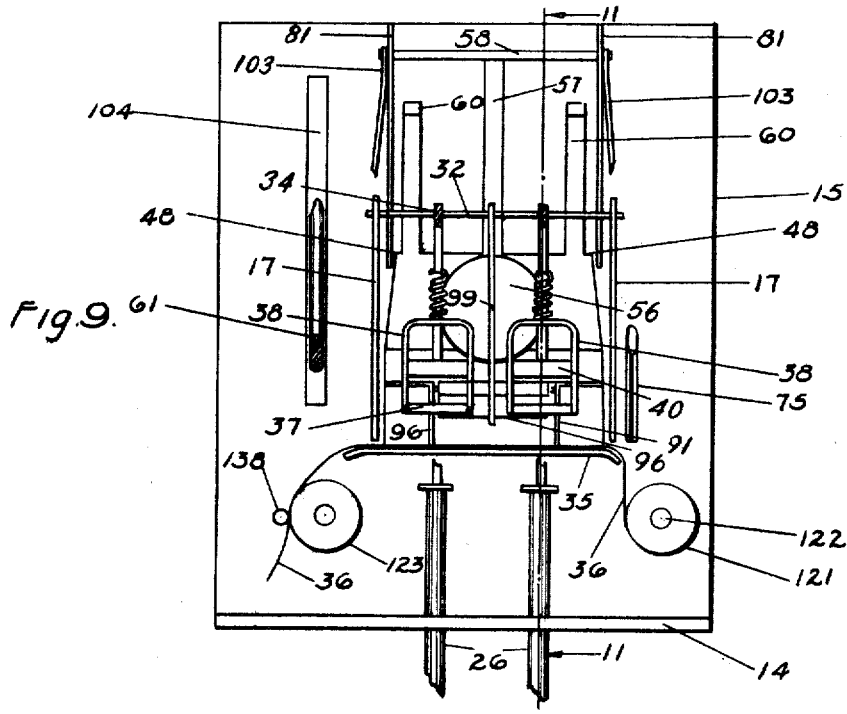
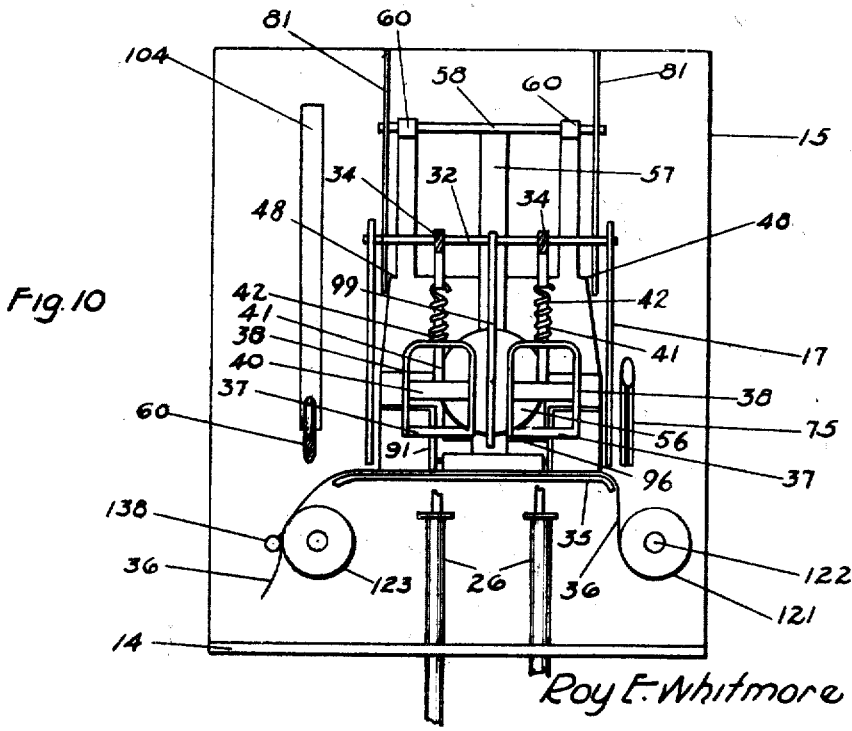
Roy E. Whitmore Inventor
By
Attorney

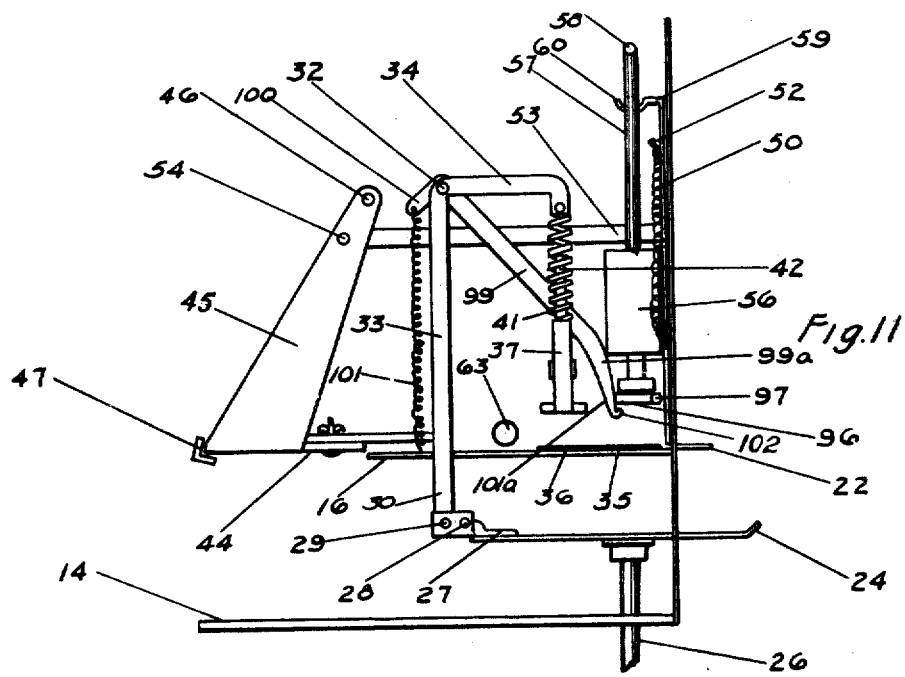
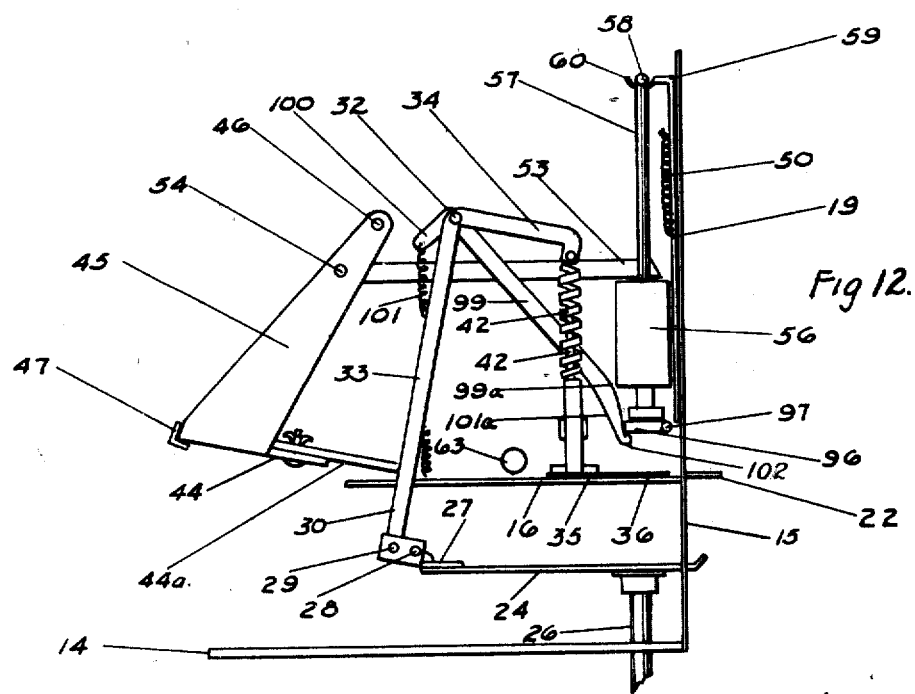

Oct. 23, 1945.   R. E. WHITMORE   2,387,312
PARKING VEHICLE ART AND APPARATUS
Filed Nov. 26, 1942   10 Sheets-Sheet 8
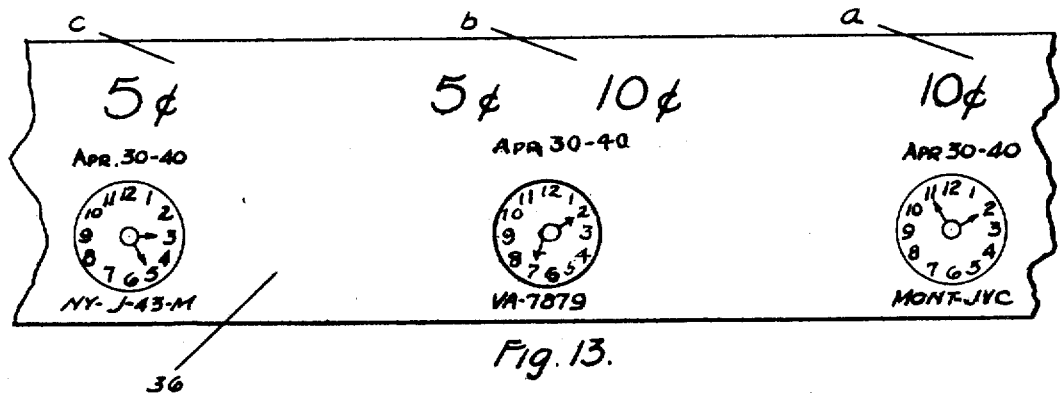
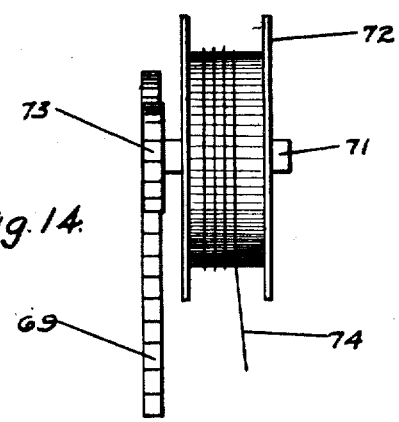
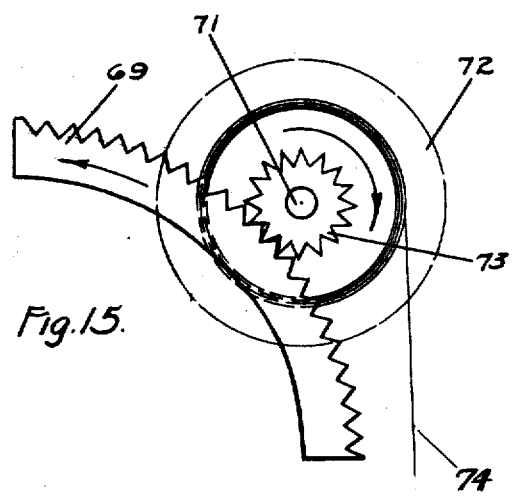
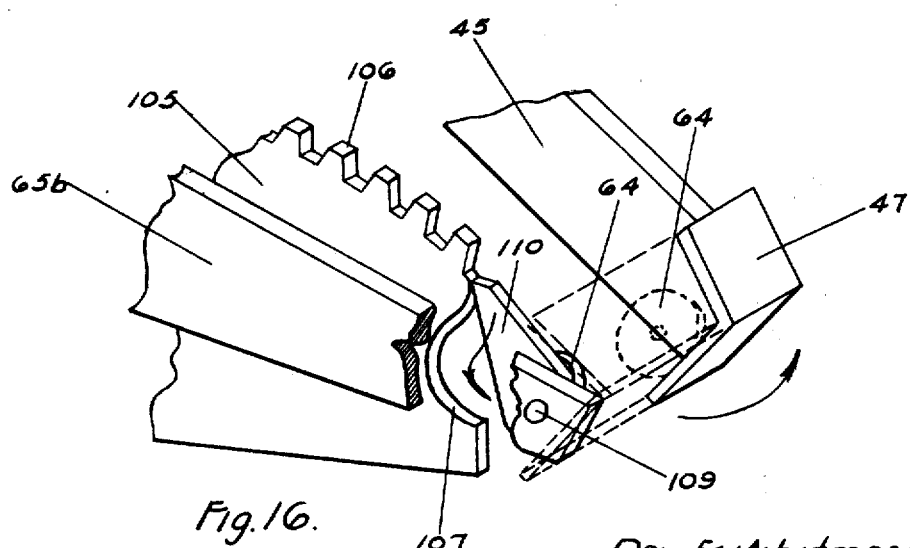
Roy E. Whitmore Inventor Oct. 23, 1945.   R. E. WHITMORE   2,387,312
PARKING VEHICLE ART AND APPARATUS
Filed Nov. 26, 1942   10 Sheets-Sheet 9
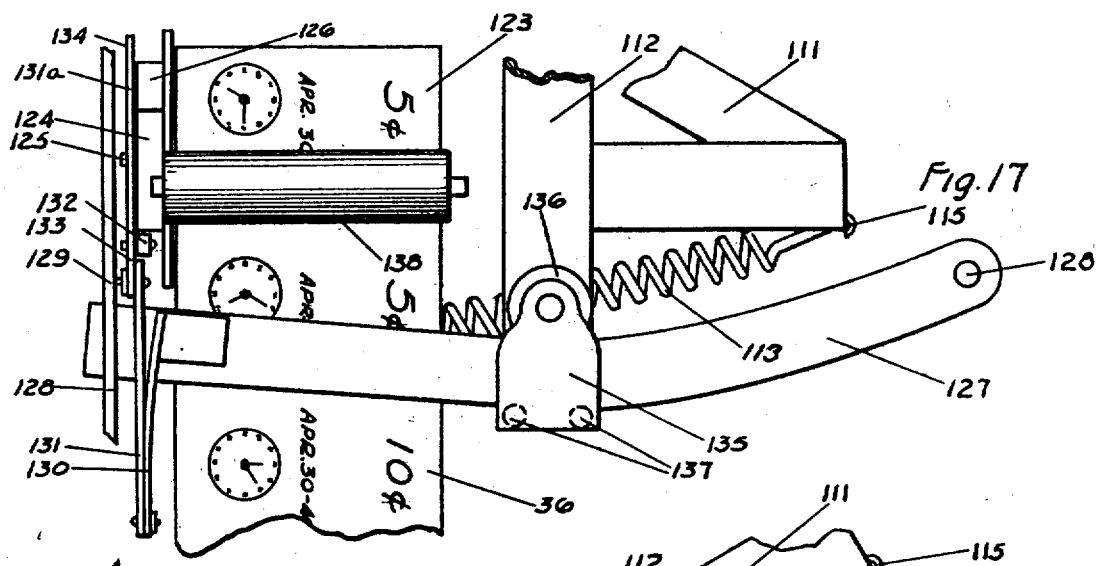
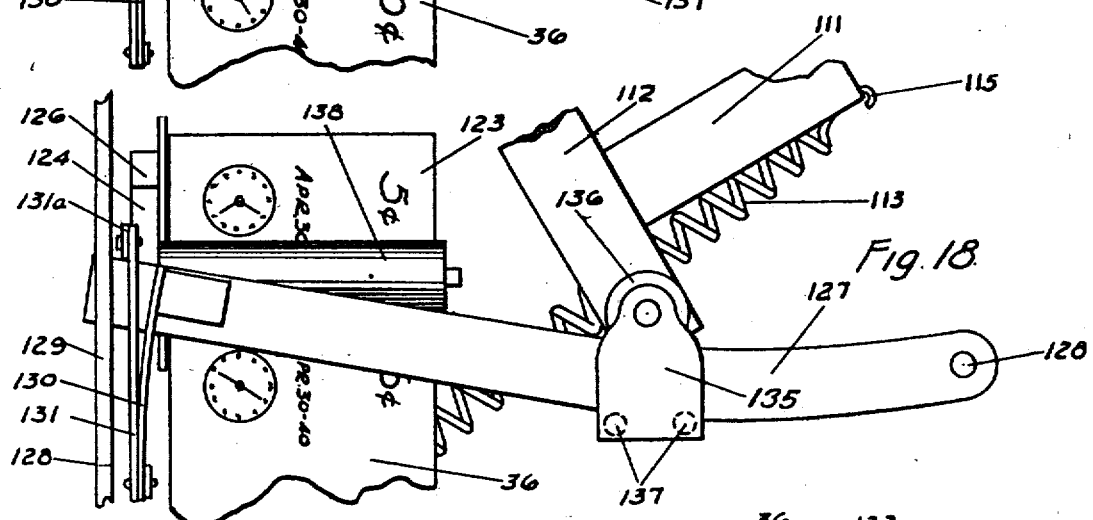
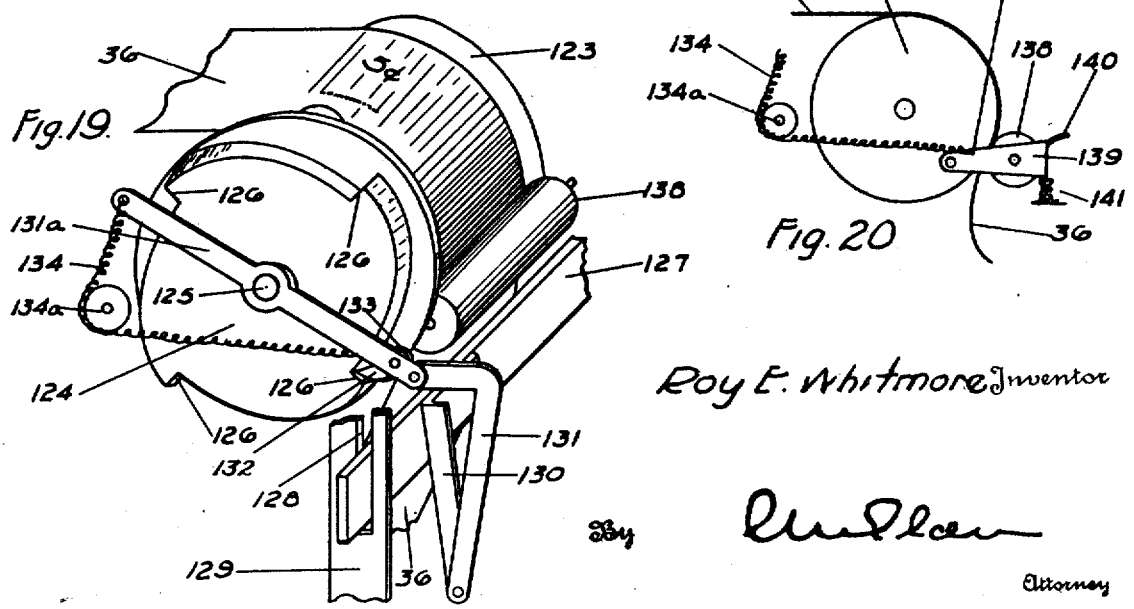
Roy E. Whitmore Inventor

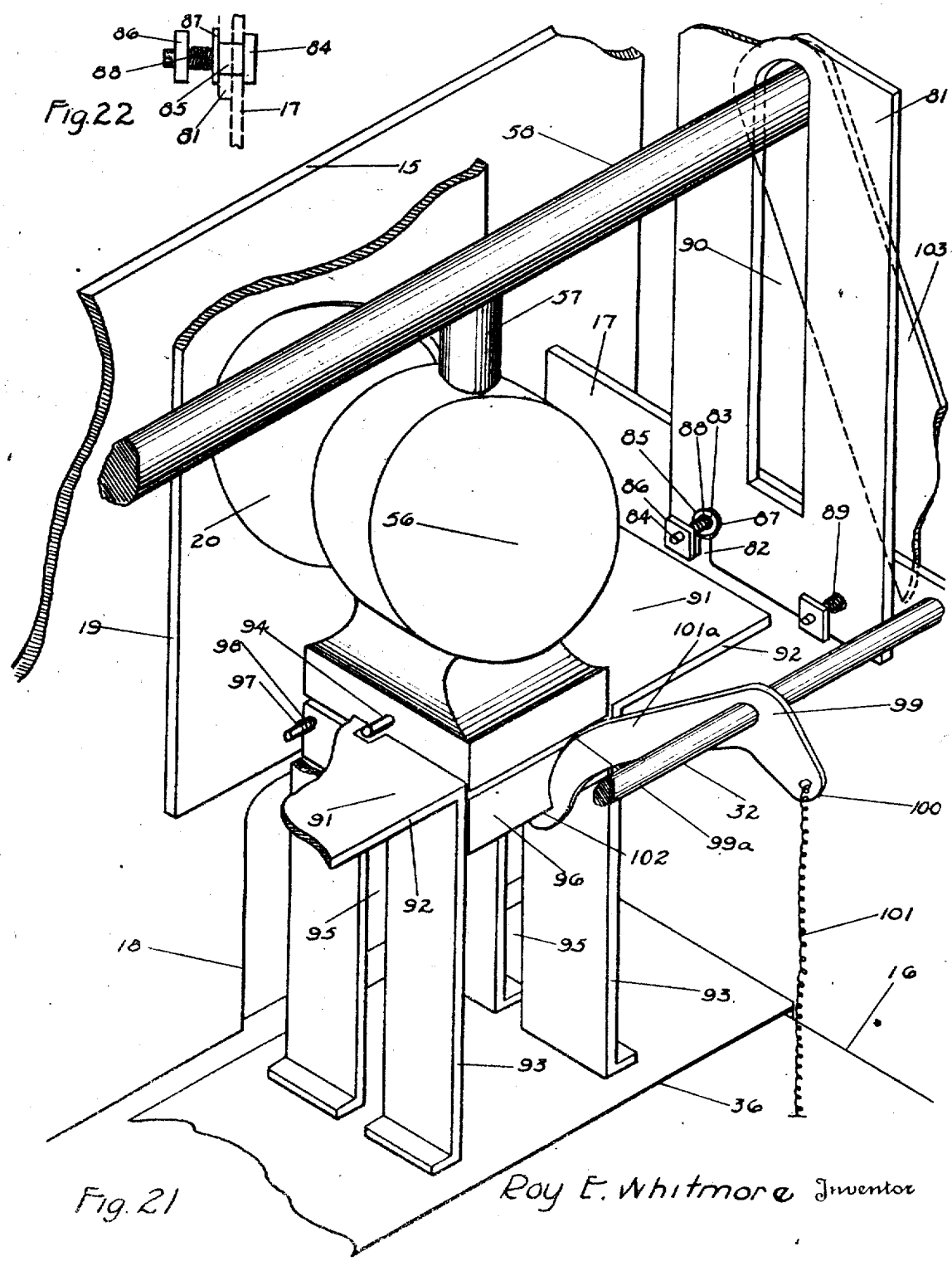

Patented Oct. 23, 1945

2,387,312

UNITED STATES PATENT OFFICE 2,387,312

PARKING VEHICLE ART AND APPARATUS

Roy E. Whitmore, Staunton, Va.

Application November 26, 1942, Serial No. 467,020

15 Claims. (Cl. 234—1)

This invention relates to lots used for parking automobiles and other vehicles, and more particularly concerns such lots having self-service or automatic features. It further concerns a registering device for use upon parking lots of this general type and rendering possible such automatic service hereinafter described.

One object of my invention is to evolve a parking lot which provides parking service which can be availed of by the patrons in simple and expeditious manner, which requires minimum attendance by the operators of the lot, has low operating costs and produces increased profits at low tariff to patron, while at the same time permitting ready and accurate check by the operator as to whether the privileges of the parking lot are being paid for on behalf of each vehicle thereon, and if those privileges are not paid for in any respect, to determine readily which particular vehicle or vehicles is the offender, and precisely in what respect the rules of the parking lot are being transgressed.

Another object is to produce a coin-actuated registering device for use as an integral part of the parking lot, and which provides the self-service or automatic features heretofore referred to, which device is compact, comparatively simple in construction, is rugged, does not easily get out of order, is readily accessible for repairs when they become necessary, which compels the entry of a complete record as to the time that each vehicle is parked on the parking lot, the amount of time for which payment is made, and suitable identifying indicia for determining the precise vehicle in question, which permits the removal and return of the vehicle from the parking lot during the parking period initially paid for without additional cost, which permits identifying which particular vehicle has been paid for by means of slugs or unacceptable coins, and which is substantially fool-proof and tamper-proof.

Other objects and advantages will in part be pointed out hereinafter and in part will be obvious from the following description.

My invention accordingly resides in the several elements and features of construction and operational steps, and in the relation of each of the same to one or more of the others, all as is more fully pointed out hereinafter, taken in light of the appended claims.

In the drawings, wherein I illustrate one embodiment of my invention which I prefer at present, Figure 1 is a schematic perspective view showing a parking lot embodying the novel features of my invention, and disclosing the booth in which I prefer to house the metering and registering device which forms an integral part of my invention;

Figures 5 and 6 are like side elevations, parts being stripped away or omitted for the sake of clarity, and looking from the right front of the device, and respectively illustrating the window-actuating, time clock mechanism-actuating, and recording strip-actuating mechanism;

Figure 7:
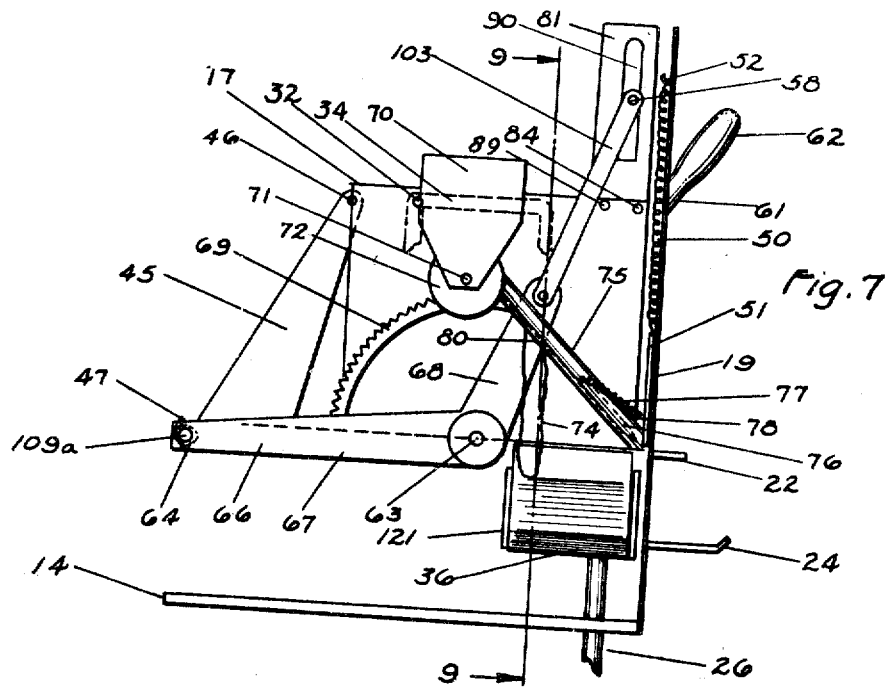
Figures 7 and 8 are like side elevations, taken from the right rear of the device, with the actuating lever in its raised and lowered position, respectively, and illustrating the manner in which functions the reel carrying the marking means.
Figure 8:
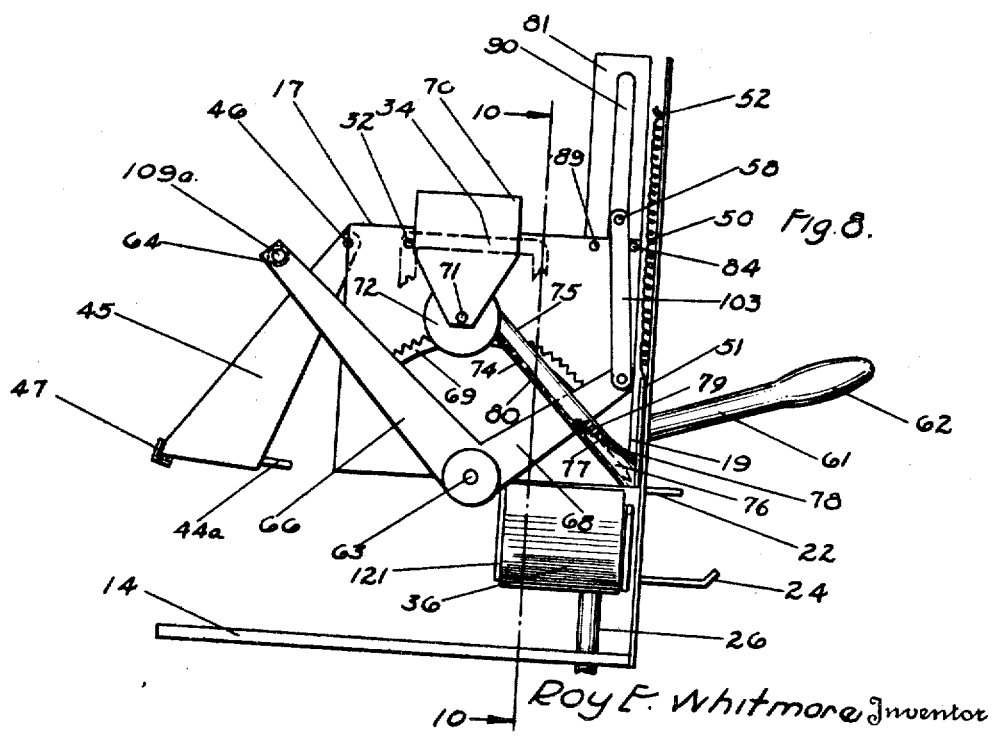

Figures 9 and 10 are like views, partly in elevation and partly in section, taken respectively on the lines 9—9 in Figures 5 and 7, and 10—10 in Figures 6 and 8, showing the time clock in raised and lowered position, respectively, these views looking towards the front of the device;

Figures 11 and 12 are like fragmentary elevations showing the cooperation between the coin slide-actuated mechanism and the window-actuating mechanism, Figure 11 illustrating the coin slide in its rest or extended position, and Figure 12 showing it in its seated or operable position;

Figure 13 depicts the time strip according to my invention, showing the manner in which imprints are made thereon by the time clock as the strip progresses step-by-step across the window opening;

Figure 14 is a fragmentary rear elevation and Figure 15 a side elevation looking from the left rear of the device, showing details of the take-up reel for the marking means;

Figure 16 is a fragmentary perspective view taken at the left rear of the device, showing the change-over mechanism for the segmental rack bar controlling movement of the main lever;

Figures 17 and 18 show, in side elevation, details of the actuating mechanism for step-by-step control of the main roll of the paper feed mechanism according to different positions of the actuating lever (not shown);

Figure 19 is a fragmentary perspective view showing details of the pawl mechanism and associated plate cam for camming the main roll in clockwise direction, step-by-step;

Figure 20 is a fragmentary end elevation showing the main feed roll and particularly disclosing the manual control for the auxiliary feed roll which is associated with the main feed roll;

Figure 21 is a perspective view, looking from the left rear of the machine in a forwardly direction, and disclosing details of the time stamp and allied mechanism; while Figure 22 discloses in fragmentary front elevation structural details of the latching mechanism for the upper time clock guides.

As conducive to a more thorough understanding of my invention, it may be noted at this point that the tendency is becoming increasingly pronounced to store passenger automobiles and other vehicles on private parking lots, particularly for intermittent daytime use. The trend towards this practice is accelerated by numerous causes, among which may be listed the tendency towards concentration of population in large cities, and the growing practice of travelling to urban business centers from suburban residential communities, by automobile or other vehicular conveyances. With the provision of parking lots at all available downtown spots in business and commercial centers, as is nowadays often the case, where space is at a premium and rentals are high, it is frequently desirable to provide parking lots on comparatively small plots of ground. Operating expenses, regardless of the area of the parking lot, must at all times be kept to a minimum.

Heretofore it has been considered essential that an operator or operators at all times be located on the parking lot and be readily available to the customer, both to park the car and issue identification tags, and to pick up the surrendered tag when the customer returns for his car and receive the money therefor.

Ordinarily, therefore, at least one and usually two or three operators are required at all times when any particular parking lot is in operation. The necessity of keeping an operator or attendant always in attendance has heretofore made it economically impractical, in many cases, to operate small-sized parking lots; and even in the instance of large lots, the salaries of a large retinue of attendants frequently spells the difference between sizable profit on the one hand and merely moderate returns or too high a tariff on the other hand.

The additional drawback is present from the standpoint of the customer in the operation of parking lots as hitherto practiced, that once the car or other vehicle is removed from the parking lot, it cannot be returned without the payment of a new fee, which usually is greater for the first unit of time than is the charge for subsequent time units of like value, so that in some instances an appreciable out of pocket loss results to the user.

Even in those instances where the parking lots are of the so-called self-service type, the practice heretofore has been simply for the customer to drive his vehicle on the parking lot, park the car himself, and thereupon obtain from the attendant a check which he presents upon his return to the lot, at which time he pays for the parking privilege, and himself drives the car or other vehicle out of the parking lot. It is this self-parking and self-removal which constitutes the self-service feature as heretofore known.

The essential requirement in all of these illustrations just recited is that one or more persons be constantly in attendance at all times during operation of the parking lot. This makes it impracticable from an economic standpoint to operate parking lots on small plots of ground in downtown business, commercial and industrial sections, where land values are elevated and taxes are high. Even when the schedule of parking tariffs is raised, it is still not feasible to pay both the high rental charge and the salaries of the attendants, and return a profit at the end of the accounting period. When viewed from the standpoint of the customer on the parking lot, the disadvantage is inherent, as hereinafter pointed out, that the parking lot cannot be used, except in infrequent instances, over and over again during the course of the day without paying a new fee each time the vehicle is parked thereon.

An object of my invention is, therefore, to avoid the disadvantages and drawbacks set forth in the foregoing, and to evolve a method of parking, together with the means for carrying that method into effective operation, which permits parking vehicles on a parking lot in the absence of all but infrequent supervision at indefinite intervals of time, it nevertheless being possible to maintain close check on the vehicles using the parking lot, so that a prospective user of the lot does not park thereon without registering his license number and other specified indicia, he being compelled to pay before registration is possible.

Figure 1:
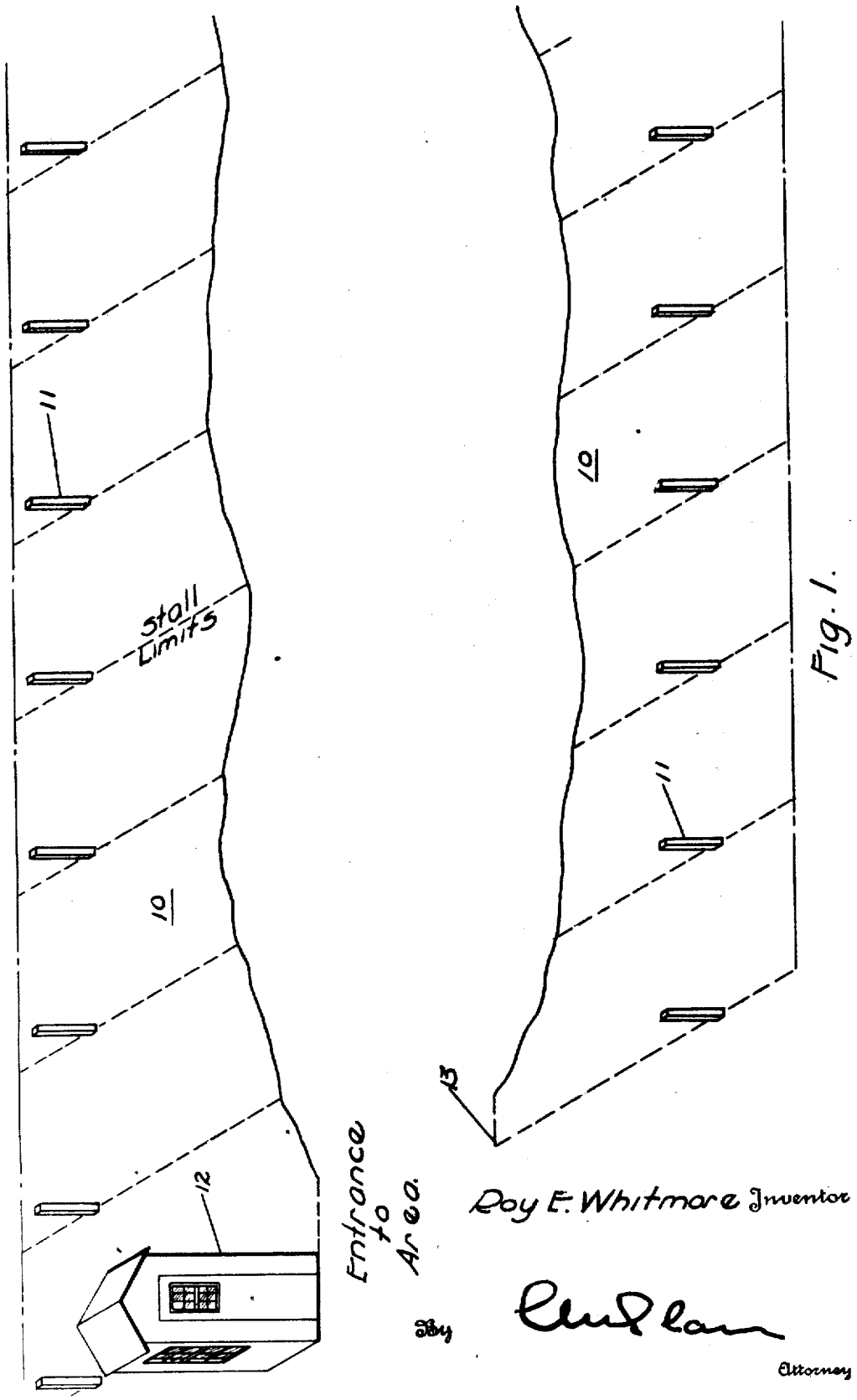

Briefly stated, my invention consists in providing a parking lot, which, for convenience in parking (reference being had to Figure 1), may be divided off into a plurality of stalls 10. If the parking lot is thus divided into stalls, these stalls can be numbered, and the number of the stalls may be employed as part of the identifying indicia referred to. However, it is entirely feasible to omit dividing the lot off into stalls, it being sufficient simply that the vehicle being parked is placed at a suitable place on the parking lot. This parking is accomplished by the driver. For convenience in parking, posts 11 of wood, concrete or other suitable material are set into the ground, dividing off the lot into stalls, and being set near the back of the stalls, to avoid interfering with positioning the vehicle in the stall. The driver, after locking his car or other vehicle should he so desire, then goes immediately to a booth or other housing 12 located on or nearby the parking lot, preferably adjacent one corner thereof, or adjacent one of the entrances 13 to the lot. In this booth is arranged a coin-actuated mechanism on which may be registered the license number or other identification of a vehicle; the time of parking, upon deposit of suitable coin or coins, being automatically printed, together with amount of payment at time of payment, before the transaction may be completed.

The patron inserts one or more coins, in accordance with a prevailing schedule of tariffs, in coin-slots provided in the front of the metering device, in payment for the anticipated total length of stay on the parking lot. When the loaded coin slides are seated home, a window is raised in the front of the device, exposing a window opening. Suitable record means, which conveniently may take the form of a continuous strip of paper, is exposed upon raising the window of the device. The coin slides, when seated home, bring about actuation of stamps. These make an impression on the field of the record strip adjacent the window opening, of the total amount of coins deposited for the particular vehicle.

A pencil, stylus, or other marking means is made available through the window opening, being chained to a reel on the frame of the device. This serves for inserting on the paper strip identifying data concerning the particular vehicle such as the license tag number and state of origin, an arbitrarily selected identifying number or the like.

To protect his investment the patron finds it necessary to close the window, and this is done by depressing an actuating lever which protrudes through the front of the machine. Upon actuation of this lever, or other control means, a time clock pivotally mounted on the frame of the device or any other suitable time-metering mechanism is operated so as to provide a time imprint on the recording strip adjacent the window opening. As one sequence of operations the parking pencil or the like is reeled up, the window is closed, and at the conclusion of the downward swing of the actuating lever the recording strip is moved forwardly.

In lieu of the pencil, stylus, or other manual marking means it is of course entirely feasible and is within the province of my invention to provide a typewriter keyboard or number printer of either conventional or modified type, the structural changes required in such instance being minor and entirely routine and obvious. A number printer will serve adequately, inasmuch as duplication of license numbers of vehicles on the parking lot will seldom occur, so that in practically all instances, reference to the state of origin of the vehicle may safely be omitted. Similarly if desired, a suitable photographic process may be used in lieu of the window opening and associated mechanism, a registration card or suitable plate in the possession of the vehicle operator being employed to provide the required data. In such instance the printing mechanism is simply unlatched by operation of the coin slide or slides, rather than the actuation of the window mechanism. Finally, the time-stamp, which in my preferred embodiment is operated by clockwork mechanism, may conveniently be replaced by an electric time stamp or the like. Regardless of the type of clock employed, this clock, in addition to providing an imprint on the record strip of the time at which the coin or coins were deposited, can also be employed to print the date of each transaction. If desired, of course, the record strip may be replaced daily or the entries on the continuous strip removed daily. An additional refinement which conveniently may be employed in some instances is to provide the registering device with a receipt printer of conventional type such as are now employed in cash registers and similar installations, to ensure to the patron a record which is a substantial duplicate of that provided on the record strip.

Within the housing or booth provided adjacent the parking lot I prefer to provide a vertical partition dividing the housing into a front, patron's booth, and a rear booth intended for the operator. The coin-actuated metering and registering device is mounted in said partition, with its front disposed towards the front booth and the rear part thereof extending into the operator's booth. Available to the patron, therefore, are the coin slides, a window opening, normally closed, an indication of the time, and an actuating lever for the operation of the registering device.

As a typical instance of a coin-actuated metering and registering device forming part of my invention and which I prefer at present to employ, reference may be had to the construction shown in Figures 2 through 22 of the accompanying drawings. For convenience, such device may be considered as consisting of six essential mechanisms, and likewise for convenience, the metering and registering device will be discussed under the following headings: Coin-slide mechanism; Window mechanism; Marking mechanism; Time clock mechanism; Actuating lever; Record strip advance mechanism.

Coin-slide mechanism

Figure 2:
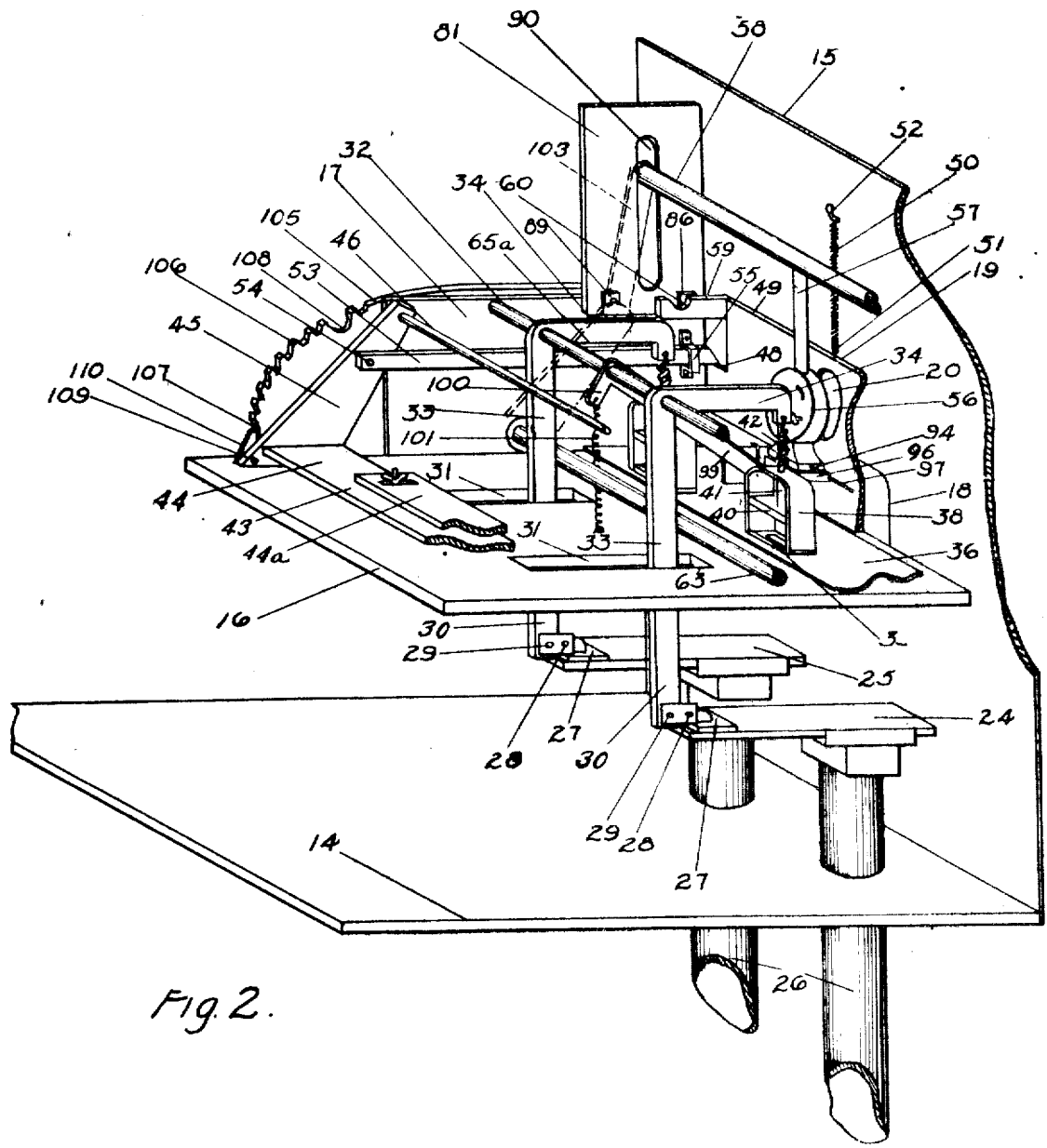
Figure 2 is a perspective view looking forwardly from the right-hand rear of the device.
Figure 3:
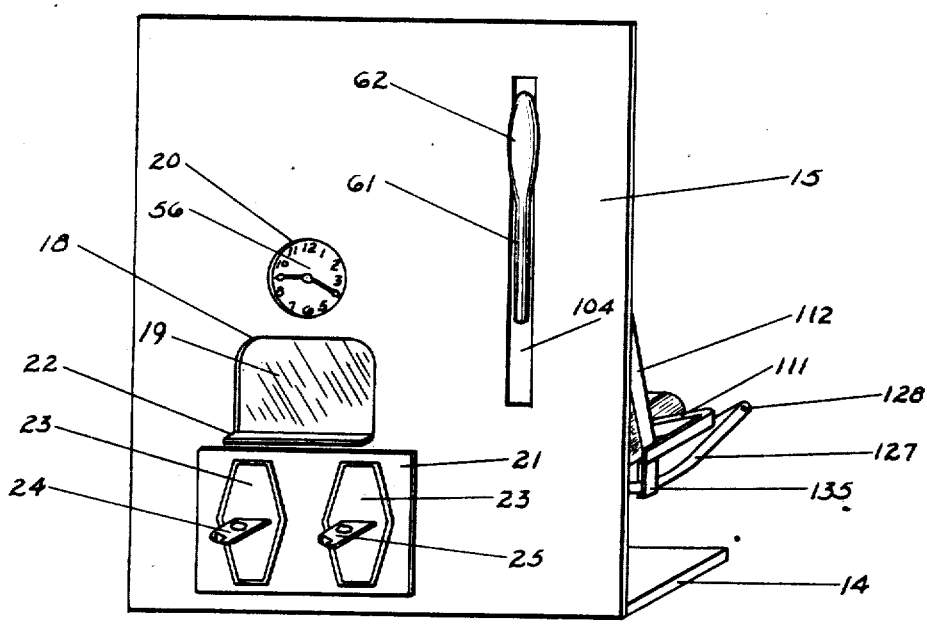
Figures 3 and 4 are like perspective views, looking from the right front of the registering device, and respectively showing the recording window in its closed and open positions.
Figure 4:
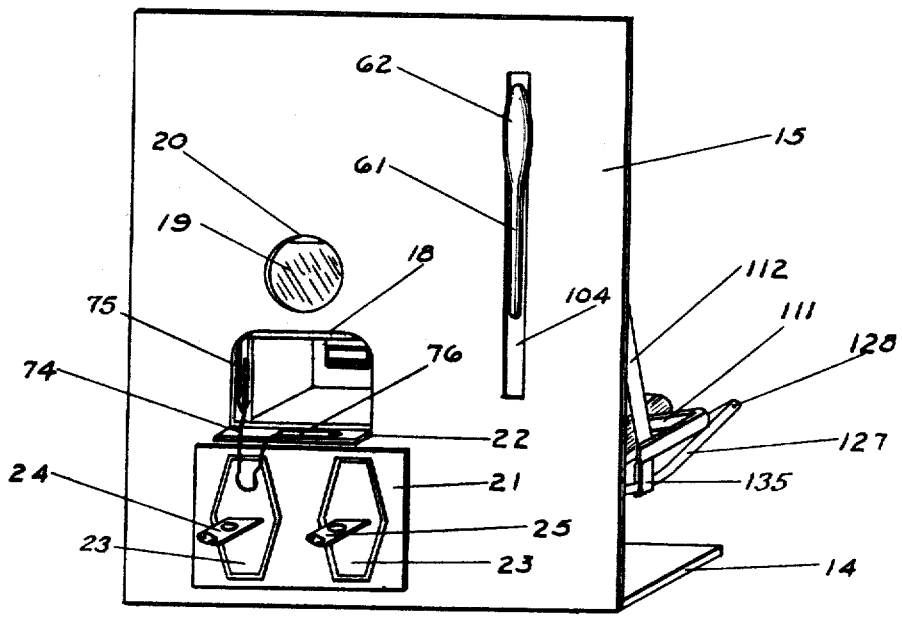

As is evident from Figures 2, 3 and 4, the frame of the machine consists in part of a bottom, substantially horizontal frame member 14, and a front, upstanding frame member 15 secured in desired manner to member 14. A second intermediate frame member 16 extends horizontally rearwardly from front member 15 intermediate the vertical reach of the latter. This member 16 is supported and trussed by side frame members disposed vertically and tied in with the front frame member and extending rearwardly thereof, one of these frame members being disclosed at 17 in Figure 2.

Directing attention for the moment to the construction of Figures 3 and 4, it will be seen that a window opening 18 is provided in front member 15, which opening, in Figure 3, is closed by a suitable window 19. With the window 19 closed, a sight opening 20 is disposed in frame 15 above the window permitting view of the time clock positioned rearwardly thereof. In the position of the parts disclosed in Figure 4, the window 19 is raised, permitting access to the parts of the device disposed behind the window opening 18. In its raised position the window 19, as will be seen from Figure 4, covers the window 20, cutting off view of the time clock.

A face plate 21 is mounted at the front of the frame member 15, and overlying this member and at the bottom of window 18 is a platform 22, the purpose of which will be disclosed hereinafter. Escutcheon plates 23 are provided on the face plate 21, for purposes of appearance, and these escutcheon plates receive coin slides indicated generally at 24, 25. As is evident from consideration of Figure 2, these coin slides extend rearwardly beyond plate 15. The coin slides are of conventional type, well known in the art, and are adapted to receive coins of different denominations. Further description of the precise construction of the coin slots is deemed unnecessary since their structure is conventional and forms no part of this invention. Coin wells or tubes 26, 26 receive the coins when the coin slides are seated home.

Now having reference more particularly to Figure 2, but directing attention also to Figures 11 and 12, inspection discloses that the coin slides 24, 25 are hinged in conventional manner at their rear ends, at 27, 27 to links 28, 28 which in turn are pivoted at their other ends, at p'ns 29, 29, to the ends of rocker arms indicated generally at 30, 30. These rocker arms are free to rock in slots 31, 31 provided in frame member 16 (Figure 2). They are free to revolve about shaft 32 which extends laterally between side frame members 17, 17. The rocker arms in general have the shape of inverted L's, the vertical legs 33, 33 being disposed rearwardly and having their longitudinal axes substantially intersecting the axis of the shaft 32. The short legs 34, 34 of the L's are disposed forwardly and horizontally, and their longitudinal axes in similar manner substantially intersecting the axis of shaft 32. Frame member 16 at its forward end is provided with a platen 34 (Figures 9 and 10), across which passes a record strip 36, behind and adjacent the window opening 18, and normally being separated from the latter by window 19.

Associated with each rocker arm is a self-inking printer indicated generally at 37 (Figures 9 and 10). This printer is of entirely conventional design, and consists generally of a stationary frame 38 closely overlying the registering strip 36, a sight opening 39 (Figure 2) through which the stamp prints, a number stamp 40, and a plunger 41 fast to the stamp and slidably extending through the top of the frame 38. Loosely coiled about the plunger 41 and fast to the free end of arm 34 is a coiled spring 42. This coiled spring serves as a cushioning device to transmit, in the absence of abrupt shock, the impelling force of the arm 34 to the spindle 41, causing the number printer corresponding to each coin slide to make an imprint on the field of the paper strip 36 adjacent the open window at such time as a coin slide is operated upon insertion of a coin therein.

Disposed rearwardly of these coin slides, within the range of action thereof, is a releasing coupler, here indicated (Figure 2) as being of substantially U-shape, and indicated generally by the numeral 43. This releasing coupler consists of a web or yoke portion 44 disposed either horizontally or at but a slight angle thereto, and upstanding arms 45, 45. A releasing coupler shaft 46 is made fast to the side frame members 17, 17. The arms 45, 45 are pivotally swung on this last-mentioned shaft, for purposes which will be described hereinafter.

Reference to Figures 8 and 16 discloses that this U-shaped coupled is provided with extensions 47 which extend outwardly beyond the arms 45, 45, to serve as stops, as will be developed more fully hereinafter.

It is to be noted at this point, as disclosed in exaggerated manner in Figures 11 and 12, that upon seating home of any coin slot, the corresponding rocker arm 30 contacts the adjustable portion 44a of the yoke 44 of the releasing coupler 43 and swings the latter rearwardly so as to move the stop 47 (Figure 8) of the latter into unlatching or releasing position.

Window mechanism

It has already been stated herein, particularly in connection with the discussion concerning Figures 3 and 4, that the front frame member 15 of the device is provided with a window opening 18, normally closed by a window 19. The construction of this window can be best seen from Figure 2. Referring to that figure it will be seen that the window 19 is provided on its vertical ends with recesses providing shoulders 48, there being one such shoulder on each side of the window, that on the right side in Figure 2 not being shown. Thus the upper part 49 of window 19 is of reduced width. A spring 50, preferably of the coiled type, is made fast to the upper end of window 19 at 51 while at its opposite end it is anchored to a stud or the like 52 made fast to the upper rear of the front member 15. This spring is made comparatively strong and serves to bring the window 19, when the latter is unlatched, smartly up to a position where it exposes the window opening 18, as shown for example in Figure 4. A side view of window 19 in its raised position may be had in Figure 5.

Pivoted to the inner faces of the arms 45, 45 of the U-shaped coupler member 43 are latch bars 53, 53 (Figure 2) (only one of which is shown), the pivotal connection with the arms 45, 45 being near the upper ends of these latter, as at 54. The latch bars 53, 53 extend forwardly in nearly horizontal manner. For convenience, I provide on the inner faces of the side frame members 17, 17, near the front thereof, looped guides 55, 55 through which slide the latch bars 53, the front ends of these latter being thereby restrained to rectilinear motion.

Suitable means, to be described in much greater detail hereinafter, are provided for stamping on the record strip 36 in the field opposite the window opening 18, a record as to the time and perhaps date on which entry is made on the register slip. While this time-stamping means may take the form of an electric time stamp or the like, it is shown here, in Figure 2, directly in the rear of the window 19, as comprising a spring-rewind time clock 56, reciprocable in a vertical direction. Time clock 56 is made fast at its upper end to a post 57, which in turn is connected with a time-clock guide shaft 58 extending horizontally and parallel to the front frame member 15. Only so much of the time-clock mechanism will be discussed at this time as is required for complete understanding of the construction and operation of the window 19.

At the top, outer ends of the portion of reduced width 49 of the window 19, rearwardly extending stirrups 59, 59 are provided, extending back at substantially right angles to the window 19. These stirrups are provided with semi-circular recesses 60 on the upper surfaces thereof registering with and adapted to engage the under surface of guide shaft 58 when the window is raised to its top position, as fully shown, for example, in Figure 12. Now, when the time clock is lowered in manner hereinafter to be described, into registery with the record strip, the guide shaft 58, through its engagement with stirrups 59, pulls down the window 19 against the tension of the spring 50 and into position where it closes the window opening 18 and the latch bars 53 are re-seated, due to the mass action of the U-shaped stirrups 43. To ensure positive re-latching, it is desirable to have the U-shaped coupler 43 of appreciable weight.

Marking mechanism

Each time that the window 18 is opened, it is necessary, in order to complete the record data which must be inserted on the working field of the record strip 36, that certain information be inserted concerning the particular vehicle being parked. This may be done in numerous ways, as for example, by the use of a keyboard, by photographic process, and by other convenient means. In the embodiment undergoing discussion, however, I prefer to provide a marking stylus or pencil. Frequently, however, it happens that the patron will not himself have available a pencil, stylus or other marking means such as is required; and it is desirable, in accordance with my invention, that marking means be attached permanently to the device which, while being made readily available at the time that the device is brought into condition for use by the patron, that is, when the window 18 is open, nevertheless is of such construction that the marking means can be removed in unauthorized manner only with extreme difficulty. The construction of the marking mechanism is best illustrated in Figures 7 and 8, further reference being had to the details shown in Figures 14 and 15.

Referring first, however, to Figures 5 and 6, it will be seen that main actuating lever 61, which protrudes outwardly beyond the front frame member 15, terminating in handle portion 62, is made fast at its lower rear end to a main shaft 63 which extends horizontally parallel to the front member 15 completely across the device. Thus actuating lever 61 serves to rock the shaft 63. Stops 47 (Figure 8) provided at each end of the yoke portion 44 of the U-shaped releasing coupler 43 are adapted to receive and engage with anti-friction rollers 64 (Figures 7, 8 and 16) on the ends of bell-crank levers indicated generally at 65 (Figures 5 and 6) and 66 (Figures 7 and 8) disposed on opposite sides of the lateral frame members 17, 17. Referring more particularly to the bell-crank lever 66 (Figures 7 and 8), this is made fast on shaft 63, outside frame member 17, and is rocked with said shaft. In the rest position of the device, with the actuating lever 61 in its raised position, the rear leg 67 of this bell-crank lever extends rearwardly and substantially horizontally of its pivot point about shaft 63, while its front leg 68 extends upwardly from this pivot point. In the rest position shown in Figure 7, the bell-crank lever 66 is latched by stop 47, and is restrained against movement.

Fast to the bell-crank lever between arms 67 and 68 is hung a gear quadrant 69 having outwardly extending teeth. A bracket 70 is made fast to the top of side frame member 17, adjacent quadrant 69, and extends laterally outwardly from the frame member 17 preferably taking the form of an inverted U-shaped member and carrying between its legs a rotatable shaft 71. A take-up reel 72 is mounted for rotation on this shaft (Figure 15), and as is shown in Figures 14 and 15, a pinion is mounted on shaft 71, and meshes with gear quadrant 69. Thus, when actuating lever 61 is swung downwardly in its working stroke, thereby rotating shaft 63, bell-crank lever 66 is likewise rocked, swinging gear quadrant 69 through its arc. As the gear quadrant 69 is swung forwardly, the meshing of its teeth with those of pinion 73 causes take-up reel 72 to be rotated in a counter-clockwise direction, winding up the chain associated therewith. A chain, cable, rope or other suitable securing means 74 is made fast at one end to take-up reel 72 and is wound, or unwound, as the case may be, as the gear quadrant 69 is rocked. A chute 75, conducting and guiding the chain 74, extends downwardly from the lower front of take-up reel 72 to the right bottom of the window opening 18, (i. e. to the left of window 18 as seen in Figure 4). A pencil, marking stylus or similar marking means 76 is made fast to the free end of this chain, and is available, when the window is open, for use by the patron. The length of the chain is such that the pencil can be readily manipulated by the patron, without any tendency towards binding. When the actuating lever 61 is swung downwardly through its working stroke, in the manner described hereinbefore, the counter-clockwise rotation of the take-up reel 72 causes the cable 74 to be wound up on the reel 72, retracting the marking means 76 out of the window opening and up into the chute 75. During the same working stroke of the actuating lever 61, the window 19 is lowered and re-latched. It is desirable, in such case, to provide some means for positively ejecting the marking means 76 towards the bottom of chute 75. When the device is readied for the next use thereof, I provide such ejecting means in the form of a coiled spring or the like 77 fast at one end 78 to the chute 75. At its other end 79 (Figure 8) this spring is received about the chain 74. When the chain 74 is reeled up, therefore, spring 77 slips along the latter until the head-end of the pencil 76 contacts it, whereupon the spring 77 is stretched, biasing the pencil in an unwinding direction.

As the actuating lever 61, having reached the bottom of its stroke, begins its return journey towards its raised or rest position, the gear quadrant is rocked in a counter-clockwise direction (Figure 15), thereby unwinding reel 72 in a clockwise direction. The spring 77 pulls the pencil 76 downwardly in chute 75 into contact with the window 19, so that as the latter is raised, the pencil falls forwardly onto the platform 22, immediately in front of the window opening. To take care of the slack in the chain 74 when the actuating lever 61 is in its raised position and the reel 72 is unwound the bottom of the chute 75 is provided with a longitudinally extending slot 80 (Figure 7) into which the surplus, unwound length of chain drops and hangs in pendant manner. This is fully shown in Figure 7, and serves to protect the chain against kinking or breaking. When the window is raised and the pencil pulled outwardly, the hitherto pendant portion of the chain 74 is readily pulled outwardly by the patron, and slides through the forward portion of the chute 75, without hindrance by the spring 77.

*Time clock mechanism*

It has been stated hereinbefore, first in connection with the discussion of the window mechanism, that a time clock is employed, and that a sight opening 20 is provided in Figures 3 and 4 for viewing the time clock when the window is in its closed position. Additionally, in the discussion of the operation of the window mechanism casual reference has been made to the clock 56 of Figure 2. It is in order at this point to make further disclosure of the time clock actuating mechanism.

It has already been stated hereinbefore that an electric time and date stamp may be substituted for the manually-rewind time clock herein disclosed, and additionally, that a date stamp can be employed when desired. Should either an electric clock or a manually-rewind clock be employed, however, it is required that this clock be capable of making an imprint on the record strip 36 in the field underlying the window opening 18.

The construction of this time clock mechanism is as follows: A time clock 56 of conventional design is employed, having manual rewind and provided with members controlling the date and other indicia employed. The details of this time clock are entirely conventional in the art, and require no further discussion at this time, since they form no part of the present invention.

As is evident from Figure 2 a post 57 is made fast to the time clock 56 at the upper end of the latter, and the upper, free end of this post is made fast to horizontal time clock guide shaft 58, already described. In the discussion of the take-up reel mechanism of Figures 7 and 8, reference has been made to the bell-crank levers 65, 66 disposed on opposite sides of the side frame member 17 and made fast to main shaft 63. Furthermore, some mention has been made in the discussion of this marking mechanism of the manner in which these bell-crank levers are released upon seating home of the coin slides by the U-shaped releasing coupler 43. When the device is conditioned for operation of the actuating lever 61, the bell-crank levers 65, 66, identical in construction, are swung through like arcs, counter-clockwise in Figure 5 and clockwise in Figure 7.

Before continuing with a description of the effect on the time clock of rocking the bell-crank levers, it is to be noted that upper time clock guides 81, 81 (Figures 2, 5-10 inclusive), identical in construction, are provided, pivoted to the interior walls of side frame members 17, 17. At the front bottom ends of these guide members modified bayonet slots 82 (Figure 21) are provided, extending vertically upwardly from the bottom edges of these guides and terminating in enlarged openings 83. Front bolts 84 (Figures 21 and 22) extend inwardly through the frame members 17, 17, these bolts having enlarged shoulders 85 adjacent the frame members, of diameter substantially that of the enlarged opening 83. The shanks of the front bolts are of reduced section, comparable with the width of the entrance to the bayonet slots 82. Each front bolt terminates in a threaded end, closed by a nut or the like 86, while a washer 87 is mounted loosely on the reduced shank of the bolt, a coil spring 88 being provided loosely about the bolt between the washer 87 and the nut 86. The construction of the rear bolts 89, 89, having reference particularly to Figure 21, is similar to that of the front bolts just described, except that the shouldered portion and the washer are omitted. Circular openings are provided in the guides 81 at the bottom rear thereof, for mounting the guides permanently and pivotally on the rear bolts 89, i. e. these openings are employed at the rear of the guides 81, 81 in lieu of bayonet slots. Guide shaft 58 is rotatably seated in longitudinal slots 90 in guides 81, for both reciprocatory and rotary movement.

The springs 88 serve to press the guides 81 resiliently against the frame members 17, 17. However, when desired, the bottom front portions of the guides can be pressed inwardly, against the action of the springs 88, to slip the enlarged openings 83 off of the shoulders 85, whereupon the bayonet slots can be slipped off the reduced diameter portions of the front bolts 84, 84. At this time guides 81, 81 can be rocked rearwardly about the back bolts 89, 89 so that the time clock can be swung upwardly, outwardly, and rearwardly by rotation of its guide shaft 58 in the guide slots 90. Adjustment or repair of the time clock is thus readily facilitated, or the time clock can be swung out of the way when access is desired to other parts of the device.

Lower time clock guides 91, 91 are provided in the form of inverted L-shaped members having their short legs 92, 92 struck inwardly from the side frame members 17, 17 and having their long legs 93, 93 extending downwardly and at substantially right angles to the front frame member 15. I provide studs 94, 94 extending laterally on opposite sides of the time clock, which studs are adapted to engage in longitudinal slots 95, 95, provided in the long legs 93, 93, thus restraining the time clock, when in its operable position, to vertical movement. In those cases, however, where it is desired to swing the time clock out of operable position in the manner described hereinbefore, the time clock, already near the top of the lower guides when in its rest position, first rides upwardly a sufficient distance to clear the studs 94, 94 of the slots 95, 95, whereupon the time clock and the upper guides are free to be swung rearwardly in the manner previously indicated.

An inking pad 96 of conventional design is swung on a shaft 97 extending transversely across the lower guides 91, 91 near the top of the long legs 93, 93 thereof. Suitable means such as a coiled spring 98 serves to bias this inking pad in an upward direction on the shaft about which it is pivotally mounted. A latch bar 99 in the form of a short rocker is pivoted on shaft 32, and has a short, rearwardly and downwardly extending arm 100, to the end of which is made fast a coiled spring 101, the other end of which spring is fast to the frame member 15. The front, latching arm 101a of this rocker 99 extends forwardly and downwardly, terminating in a catch 102 which engages on the under side of the inking pad 96, thus holding the latter positively against the urge of the time clock 56.

Links 103, 103 (Figures 5 through 8 inclusive and 21) interconnect the forward arms 65a of bell-crank levers 65 and 68 of bell-crank 66 with the guide shaft 58. As has already been stated, these bell-crank levers are fast on the main shaft 63 and are rocked by actuating lever 61 when the latter is operated. With the bell-crank levers in their normal or rest position, the front arms 65a, 68 extend upwardly, so that the links 103, 103 raise the guide shaft 58, and with it the time clock 56, to their uppermost position. The latch bar maintains the inking pad firmly beneath the under surface of the time clock, preventing downward yielding thereof against the thrust of the time clock so that the latter is always maintained properly inked. When a coin slide 24, 25 is seated home, however, so that the U-shaped release coupler 43 releases the rocker arms 65, 66, and the actuating lever 61 is thereafter manually rocked downwardly, swinging with it the main shaft 63, the front arms 65a, 68 of the bell-crank levers are rocked forwardly and downwardly, pulling with them the links 103, 103. The guide shaft 58 is rocked downwardly, being constrained by upper guides 81, 81 to vertical rectilinear motion. The time clock 56 is swung downwardly, and in so doing, contacts a shoulder 99a of the latch bar 99, thereby camming the latter against spring 101 and about shaft 32 so that the latch no longer retains the inking pad in position, and the time clock is free to swing the latter about its shaft and against its spring 98, downwardly back against the window 19, which at that moment closes the window opening. The time stamp is thus free to make an imprint on the record strip 36. As the guide shaft 58 moves downwardly, it carries with it the stirrups 59, 59 of the window 19 (Figure 2) in the manner already described. The time clock thus provides on the field of the strip 36 exposed through the window opening 18, a recording of the time and perhaps date at which the mechanism is actuated.

Actuating lever

It has been pointed out from time to time in the foregoing that the various mechanisms comprising my new metering and registering device work from an actuating lever 61, common to most parts of the device. As shown in Figures 3 and 4, the lever 61 projects through a slot 104 provided in the front frame member 15, at the right side thereof, and terminates in a handle 62. As shown in Figures 5 and 6, this actuating lever is fast to a main shaft 63 extending entirely across the device. Bell-crank levers 65, 66 are fast to this shaft 63, and thus are rocked by actuating lever 61 whenever the latter is operated. Through both bell-crank levers the time clock 56 (Figure 2) is reciprocated, while through bell-crank lever 66 and gear quadrant 69 the marking mechanism is actuated. Additionally, the actuating lever 61 indirectly controls the restoring action of the window 19, inasmuch as this latter is re-seated as an incident to downward movement of the time clock 56 in the manner pointed out hereinbefore. However, there are certain additional features of novelty resident in the mechanism subjected to control by and operating with the actuating lever 61.

Having particular reference to Figures 2, 5, 6 and 16, it is to be noted that a segmental rack 105 is made fast to the left-hand side frame member 17 (this is to the right in Figures 3, 4, 5 and 6) and to the intermediate frame member 18. This segmental rack, which may be constructed as lightly as possible consistent with rigidity, is shown in Figure 2 as having a plurality of gear teeth 106, with deepened trough-like recesses 107 and 108 at the limits of travel thereacross of a cooperating pawl member 110, to be described. The rear arm 65b of bell-crank lever 65 (Figure 16) has roller 64 (Figure 16) rotatably mounted thereon by suitable means such as shaft 109. Pivotally carried on the left hand (Figure 16) shaft or pin 109 is a pawl or dog 110 having a sharpened point adapted to engage in the teeth 106 of the rack 105. Upon movement of the bell-crank lever 65 relative to the rack 105, the pivotally-carried dog is adapted to cam in one direction and prevent movement in that direction, while it is enabled to slip the teeth of the rack upon movement of the lever 65 in the opposite direction. Thus, in the normal or rest position of the device with the actuating lever 61 in its raised position, the dog 110 is elevated so that it cams against the tooth next above (Figure 16) upon attempted counter-clockwise rocking of the lever 65, thus effectively preventing such movement. The tooth immediately below the dog 110 prevents the latter from falling into the lower direction-changing recess 107 where it will shift over to a position whereby it cams in the opposite direction. The releasing coupler 43 at this time is in engagement with, by stops 47, (Figures 8 and 16) the anti-friction rollers 64, and prevents the levers 65, 66 from dropping into a position such that the dog 110 will fall into the direction-changing station represented by recess 107.

Upon operation of the coin slides, however, the particular rocker arm or rocker arms 33, 33 rock the coupler 43, thereby releasing the bell-crank lever 65 so that the latter promptly falls into position whereby the dog 110 switches over or changes direction and thereafter will cam in a direction opposite to that in which it formerly operated. This action is brought about largely by spring 113 (Figures 5, 6, 17 and 18), later to be described. Thus, after the sequence of operations just described, if now lever 61 is pulled downwardly, causing bell crank lever 65 to rock in a counter-clockwise direction (Figures 5 and 6), the pawl 110 will not resist such motion. If, however, the lever 61 is released before it is pulled to the bottom extent of its travel, the restoring action of the mechanism is prevented due to the camming of pawl 110 in the teeth 106 of rack 105. Thus, movement can be accomplished in one direction only of the lever 61 until the full swing of the lever 61 is completed. At this time the pawl 110 has been brought to a position where it falls into the top change-over recess 108, and is therefore readied for camming in the opposite direction.

I find it advantageous to employ a small leaf spring (not shown) associated with the pawl 110 to impel it through its travel about its shaft 109 when it falls into the change-over recesses 107, 108, to ensure that such change-over operation is completely accomplished.

While the patron is compelled to rock lever 61 downwardly from its top rest position to close window opening 18 after the required data has been recorded in order to protect his investment, there is no compulsion requiring him to restore lever 61 to its top, rest position after that lever has once been brought to the bottom of its travel. To ensure that the lever is carried back to its top, rest position even should the patron release the lever at any point between the bottom of its travel and short of the top of its travel, suitable restoring means are provided. To this end, in the embodiment illustrated, and having reference more particularly to Figures 3 through 6, 17 and 18, I provide a yoke-shaped member 111, entitled a main-spring yoke, closed by a tie member 112 mounted fast on shaft 63 adjacent lever 61. A powerful spring 113, preferably coiled, and constituting a main spring, is fast at its front end 114 (Figure 6) to the frame, while its rear end 115 is fast to the apex of the main-spring yoke 111. As is clearly evident from Figures 5 and 6, when the lever 61 is in its raised or rest position, the spring 113 is nearly collapsed, and exerts but little restoring action. When, however, lever 61 is in its lowermost position, the yoke 111 is swung counter-clockwise (Figures 5 and 6) about shaft 63, and spring 113 is extended or tensioned, as in Figure 6. Upon change-over of the dog 110 in the top change-over slot or recess 108 in rack 105, the spring 113 will participate in the restoring of the lever 61, or upon release of that lever by the patron, will restore the mechanism of its own accord.

The spring 113 being extremely powerful, the restoring action normally would be quite abrupt and serious danger would exist of damage to the delicate mechanism of the time clock as well as other parts of the device unless some cushioning means are provided. In my present invention I employ a modified form of the familiar dash pot. Having attention to Figures 5 and 6 it will be seen that cylinder 116 is made fast to a frame member 117, and hence is immobile. The piston (not shown) within the cylinder has fast thereto a plunger 118 terminating in a contact button 119 or other suitable contact member. A contact shoe 120 adapted to cooperate with the button 119 in convenient manner is secured to a movable part of the device. In this instance it is made fast to arm 65b of bell-crank lever 65 near the rear end of the latter. When the lever 65 is rocked counter-clockwise (Figure 6) contact member 120 is removed from plunger 118 and button 119 so that the latter are pushed upwardly with the piston in cylinder 116. When the lever 61 is released, however, and the mechanisms are restored by spring 113 then shoe 120 contacts button 119 so that plunger 118 is seated against the resistance interposed by the piston in cylinder 116. In this manner all tendency towards abrupt stop and consequent shock is effectively avoided.

Record strip advance mechanism

Upon each actuation of my new device a new field of the record strip 36 is exposed on the platen 35 (Figures 9 and 10) underlying the window opening 18. Upon actuation of the coin slides, the first step is for the coin stamps to record on the field of the record strip the amount of money deposited. Nextly, the patron inserts on the field the identifying data concerning his vehicle. Lastly, on the same field, the time clock upon operation of the actuating lever 61 imprints the time when such entries were made.

It is necessary, to condition the device for the next subsequent registering, to move the record strip step-by-step across the machine, in order to present a new field under window opening 18. While this objective may be accomplished in a number of different manners, some of which are old in the art; in the instance under discussion, having particular reference to Figures 9 and 10, I prefer to provide a supply roll 121 on a shaft 122 made fast to the frame of the device, preferably the front frame member 15. The record strip 36 is unwound from the supply roll 121 and extends across the top of platen 35 under the side frame member 17 and lower guides 81, 81, over to a main feed roll 123 at the left side of the device (Figures 9 and 10). Some of the details of this feed roll are disclosed in Figures 17 through 19. Fast to the front of the feed roll is provided a plate cam 124, fast to the same shaft 125 as is the roll 123. This shaft 125 is rotatably journalled in convenient and conventional manner in brackets (not shown) fast to the frame of the device.

The plate cam 124 is provided with four camming shoulders 126 (Figure 19), laid off and equally spaced in separate quadrants of a circle, so that the main feed roll is advanced upon each actuation of operating lever 61, a peripheral distance just sufficient to present a new field of the record strip under the window, this distance in the present instance being one-fourth of the circumference of the roll 123. All this is accomplished in a manner to be pointed out hereinafter.

A main feed roll lever 127 (Figures 3–6, 16–19) is made fast as its rear end, at 128, for pivoting about the frame of the device. The front of this lever 127 is constrained to vertical rectilinear reciprocation by its engagement in a slot 128 provided in a guide 129 made fast to the front frame member 17. An arm 130 (Figures 17–19) extends downwardly from the front end of the lever 127, being made fast to the latter. A link 131 of substantially L-shape is pivoted at one end to the bottom of the arm 130, and at its upper end is pivoted to an arm 131a which is received on shaft 125 of the main feed roll 123. A pawl 132 (Figure 19) is pivoted to the arm 131a so as to engage against the periphery of the cam plate 124. The direction of camming is such that as the actuating lever is lowered, the pawl 132 rides freely over the surface of cam 124. When the lever 61 reaches the bottom of its travel, however, the pawl 132 engages against one of the shoulders 126 and cams thereagainst so that upon restoring action of the lever 61, the feed roller 123 is advanced by one step. A spring 133 may be conveniently employed to press against pawl 132 and bias the same into camming engagement with the shoulders 126. A retaining pawl of conventional design (not shown) is pivotally disposed on the frame of the machine at convenient point and is urged at all times against the periphery of cam plate 124. Its function is to prevent rotation of the cam plate in a counterclockwise direction, looking at Figure 19.

A spring 134, the purpose of which will be more fully developed hereinafter is shown in Figures 19 and 20 as having considerable length, and has attached at one end to the free end of lever 131a and thereafter, after extending about pulley 134a disposed inwardly and laterally (within the device) of the main feed roller 123, is connected at its other end to a bracket 138, hereinafter to be described, which receives the auxiliary feed roller 138. All this will be more fully developed hereinafter.

From the yoke 111, more particularly the tie rod 112, depends a stirrup 135 which carries a top anti-friction roller 136 and several bottom anti-friction rollers 137. The roller 136 engages on the top of the lever 127, while the rollers 137, 137 engage against the bottom of that lever. Thus, since the yoke 111 is fast to shaft 63 and is rocked by the latter upon operation of the lever 61, the stirrup 135 moves along the length of the lever 127 and rocks the latter about its pivot point 128, so that the front end of lever 127 reciprocates in its guide shaft and actuates the main feed roll. Upon downward movement of lever 61, for example, the stirrup 135 moves rearwardly along the lever 127 (Figures 5, 6, 17 and 18), tending to swing and carry the latter upwardly about its pivot 128. The spring 134, relaxed only when lever 61 is in its lowered or working position, is tensioned when the arm 131 assumes its rest position and pulls against the free end of this arm, thereby tending to participate along with the stirrup 135 in moving the lever 127 on its upward travel.

A feature of novelty in connection with the description of the stirrup 135 and its association with the main shaft 63 is that when the actuating lever 61 is first moved slightly from its rest position shown in Figure 5, an action which has been made possible by the operation of the member 47 of the releasing coupler 43 upon seating home of the coin slides 24, 25, the tie member 112 is disposed vertically, and hence in alignment with stirrup 135 hinged thereto. Thus, the stirrup 135 is free to move loosely along the main feed roll lever 127 without binding, and consequently exerts no lifting action thereon during the first portion of its travel. As a matter of fact, when the members 47 of the releasing coupler unlatch the ends of arms 65b and 67, the rocker shaft 63 first rotates clockwise a slight distance in Figures 5 and 6 to release the ratchet and under the impelling action of spring 113. This results in slight force movement of the tie member 112, an action which is taking place while the stamps 37 are registering on record strip 36. It is not until the lever 61 reaches the top of its travel in Figure 5 that shaft 63 can be rotated thereby in a counter-clockwise direction moving tie member 112 rearwardly in Figure 6 and exerting lifting action on lever 127. The advantage of this is that the stamps 37 make their impressions on a field of strip 36 while the latter is stationary. As a result, the impression is sharp and without blur. It is not until shaft 63 rocks tie member 112 into a position at a substantial angle to the perpendicular, as shown for example in Figure 6, that it lifts stirrup 135 into positive engagement with lever 127, along which the stirrup had theretofore slipped freely. After positive engagement between the stirrup 135 and lever 127 occurs, as illustrated for example in Figure 6, further rotation of shaft 63 in the same direction will result in stirrup 135 lifting lever 127 through its vertical travel as indicated clearly in Figures 17 and 18.

An auxiliary feed roll 138 serves to press strongly against the main feed roll 123 near the bottom thereof, on the side opposite the supply roll 121. This auxiliary feed roll is carried in a bracket 139 (Figure 20) pivoted to the main frame. For manual control of this auxiliary roll, the bracket 139 is provided with a finger grip 140, whereby the feed roll can be moved away from the main roll 123 when desired. A powerful spring, preferably coiled, and shown at 141, is disposed between a suitable frame member and the bracket 139 and normally urges the feed roll 138 strongly against the main roll 123. The auxiliary roll may be moved away from the main roll upon the insertion of a new roll of record paper, when it is desired to feed more than a single field of the record strip paper through the device at one time, and when it is desired to operate the device without advancing the record strip through the machine. Normally, however, the record strip rides over the main feed roll 123, overrunning the latter, and then extending down between the main roll and the auxiliary roll, the pressure of the auxiliary roll against the paper fed about the main roll ensuring that the record strip is friction-pulled along as the main roll 123 is advanced step-by-step.

A record strip in accordance with my invention is shown at Figure 13. The record strip 36 is divided into a plurality of fields, a b and c. The coin stamp 37 in field a has made a stamping showing that a tariff of 10¢ has been paid. The time stamp shows that this money was paid at five minutes of 2:00 on April 30, 1940, while the indicia inserted by the marking means 76 (Figure 7) or other suitable recording instrument shows that this payment was for the privilege of leaving on the parking lot a Montana car having license indicia JVC. Field b shows that 15¢ was paid at 2:35 on April 30, 1940, for a Virginia car having license number 7879. Finally, field c shows that 5¢ was paid at 3:25 on April 30, 1940, for a New York car having license number J-43-M.

*The operation of the coin-actuated metering and registering device*

While the operation of the coin-actuated device will in large measure be perfectly obvious from the foregoing, nevertheless it will be helpful to summarize briefly at this point the sequential steps which are taken in operating the device. Accordingly, we will assume that the patron has parked his vehicle, be the same a car, truck, trailer, horse-drawn conveyance or any other suitable road vehicle, on the parking lot, has been confronted with a sign and at the housing 12 (Figure 1) located on or adjacent the parking lot, having first provided himself with suitable identifying indicia from the vehicle, such as license tag number and State of origin, an identifying plate, or the like, and he being provided with coins of suitable denomination, he is prepared to operate the coin-actuated metering and registering device.

Having first determined the approximate total duration of stay on the parking lot that particular day, he then deposits coins permitting him the use of the parking lot for that period in accordance with a prevailing schedule of tariffs which is prominently displayed on the parking lot or the booth, or both.

The number of coin slides corresponds to the maximum number of coins which will be deposited for any one use of the metering device, inasmuch as it is certainly desirable and almost essential that the printing of the amount of coins deposited be accomplished at substantially the same time, and on but one field of the record strip, as will be pointed out hereinafter.

When the patron first sees the metering device its appearance will be substantially that of Figure 3, i. e. the coin slides 24, 25 are extended, window 19 closes window opening 18, and the face of the clock 56 is visible through the sight opening 20. Actuating lever 61 with handle 62 is in raised position.

Upon seating home the coin slides, the coins are dropped into the coin tubes 26, 26 and rocker arms 30, 30 are swung rearwardly in slots 31. As they do this, they depress the corresponding self-inking number printers 37 to print on the working field of the record strip 36 data as to the total amount of money deposited. Towards the end of their travel these rocker arms engage releasing coupler 43 and rocking the same rearwardly about shaft 46, pull latches 53, 53 out of engagement with the shoulders 49, 49 of the window 19, so that the latter is drawn upwardly by spring 50, thereby exposing the window opening 18. At the same time, spring action, aided by gravity, brings the marking pencil or stylus 76 (Figures 7 and 8) from chute 75 into the field of use on platform 22.

Simultaneously, the stops 47 (Figures 8 and 16), fast at the ends of the releasing coupler 43, are swung out of contact with the rollers 64 on the bell-crank levers 65, 66, so that spring 113 (Figure 6) can return shaft 63 to the fartherest extent of its movement in a clockwise direction as seen in Figure 6, carrying with it the bell-crank levers aforesaid and the actuating lever 61. Movement of the bell-crank lever 65 in the manner pointed out permits the dog 116 (Figure 16) to fall into the lower direction-changing recess 107, so that the dog will switch over and condition the actuating lever 61 (Figure 3) for downward swinging.

It will be kept in mind that the patron has already invested his coins in the device. When the window is opened, he inserts thereon, as by the pencil in the case shown, identifying data such as State of origin and license tag number or other arbitrary data unique to his particular vehicle. In such case the insertion of the coins will simply unlock such mechanism, or mechanisms, rather than cause a window to be raised. The controlling point, however, is that in any convenient manner, a permanent record be obtained on the record strip, in sequential manner, of the amount of money deposited, the vehicle for which it is deposited, and the time at which the money was deposited. A receipt printer of conventional form may be associated with the device, to provide the patron with a printed receipt.

Having paid his money and having entered the identifying information on the record strip, it is now necessary for the patron to protect his investment. To do this, he pulls the actuating lever 61 downwardly by its handle 62.

Having reference to Figures 7 and 8, and also to Figures 5 and 6, it will be seen that when this is done, the lever 61, fast to shaft 63, rocks the bell-crank levers 65, 66 in a counter-clockwise direction (Figure 5), so that the links 102, 102 rock the time clock 56 downwardly. At the same time the take-up reel 72 of the marking mechanism through gear quadrant 69 (Figure 8), is wound in such direction as to wind up the pencil 76 and withdraw it from the window opening, at the same time tensioning spring 77.

As the time clock 56 is lowered, the guide shaft 58 of the latter contacts the recesses 60, 60 of stirrups 59, 59 on window 19 (Figure 10) and pulls the latter downwardly until the shoulders 48, 48 of the window clear the latch bars 52, 52. As soon as this takes place, the mass action of the coupler 43 is such that the latter swings about its shaft 46 (Figure 2) in a counter-clockwise direction, re-seating the latch bars 52, 52 over the cooperating shoulders 48, 48, thereby effectively locking the window 19 in its closed position.

As the actuating lever 61 is swung downwardly the yoke 111 (Figures 5 and 6) is swung upwardly, flexing spring 113 so that the latter exerts a restoring force. When the patron releases the lever 61 at the bottom of its swing, the spring 113 tends to restore the mechanism to its rest position, or should the patron himself move the lever 61 upwardly through its path the spring 113 participates in that restoring action.

As the lever 61 swings downwardly (Figures 5 and 6) the stirrup 135 on yoke 111 moves rearwardly of lever 127, rocking the same upwardly (clockwise) about its pivot point 128, so that the forward end thereof moves upwardly in its vertical slide, and advances the arm 131a carrying pawl 132 in a generally clockwise direction (Figure 19), so that it engages the next adjacent shoulder 126 of plate cam 124. This conditions the device for step-by-step movement of the record strip 36 from its supply reel 121 (Figure 10) across to and past feed roll 123.

As the arm 65b of bell-crank lever 65 reaches the upper end of its travel along segmental rack 105 (Figure 6) the dog 110 drops into the upper direction-changing recess 106 and swings over so that it is conditioned to cam in a direction opposite to that in which it functions on the upswing of the lever. It is to be noted that this cam prevents reversal of direction of movement of the lever 61 at intermediate points along its path of travel; i. e. once the lever 61 begins its swing, it is compelled to complete its travel before movement in a reverse direction can be accomplished.

The lever 61 having reached the bottom of its travel (Figure 6), restoring action of the lever to the raised or rest position as shown in Figure 5 causes the gear quadrant 69 (Figure 7) to unwind the take-up reel 72, thereby unwinding cable 74 so that spring 77 pulls the pencil 76 into rest position just back of window 19. Surplus chain depends downwardly in a loop through slot 80. When the window 19 is next raised, therefore, the pencil 76 is spring and gravity-fed onto platform 22.

At the same time the bell-crank levers 65, 66, through links 102, 102, restore the time clock 56 to its rest or raised position (Figures 5 and 7). The window 19, however, having been latched by lock bars 52, 52, remains in its closed position. When the dog 110 approaches the bottom of its travel it is prevented from reaching the absolute limit of that travel by stop 47 (Figure 16) on releasing coupler 43. This effectively prevents the dog from falling into the bottom direction-changing recess 107. Thus the actuating lever 61 cannot again be swung in either direction until one or more coin slides 24, 25 are actuated.

As the lever 127 (Figure 5) is swung downwardly as an incident to restoring lever 61 to its upper or rest position, the pawl 132 (Figure 19) advances the record strip 36 by one step.

The tensioned spring 113 (Figure 6) exerts its restoring action on the main shaft 63, and because it is extremely powerful, this spring would normally tend to seat quite abruptly the various mechanisms of the device, with consequent risk of damage to the delicate parts thereof. Dash-pot mechanism 116, 117, 118, 119, and 120 (Figures 5 and 6) effectively serves to cushion the restoring action, so that the final movements of the various parts of the device are comparatively gentle and no damage is worked on the moving parts of the device. At this time the device is ready for operation anew, window 19 being closed and a new, fresh field of the record strip 36 being disposed beneath opening 18.

It will readily be appreciated that there is no necessity of disposing the window 19 vertically and that this latter can be arranged at any convenient angle to the vertical. Similarly, there is no requirement that the record strip 36 be disposed horizontally, and this latter can be arranged at any desired angle to the horizontal.

The storing of the coins in the coin tubes 26, 26 makes it possible for the operator, when removing these coins and upon encountering a defective coin or a slug, to check against the permanent record strip 36 and find for precisely which vehicle this defective coin was deposited. He is then in a position to warn that particular patron, or perhaps to have him punished.

Conclusion

My new invention makes it possible to operate parking lots successfully with minimum of attendance. To illustrate, in a parking lot which I have had in operation for some months, I have found it entirely practical to omit attendance of operators for as much as two or three days at a time, with return of the operator or attendant to the lot at aperiodic intervals and irregular hours, and yet have found substantially no abuse of privileges. Additionally, in those instances where slugs or mutilated coins have been employed, or where the vehicle remains on the parking lot for periods in excess of that for which payment has been made, these violations and abuses can be readily checked and the offender cautioned. Lots too small to be operated economically according to practices heretofore employed, can be utilized with gratifying profit to the operator, even when comparatively low tariff schedules are employed. Parking is facilitated for the patron, and he can park and remove his car with a minimum of effort. Data concerning parking can be inserted only upon insertion of coins in the registering device, and subsequent operation of the device in order to produce a complete record is made mandatory upon the patron, in order to protect his investment. Additionally, my new parking lot system and method of operating the same render it possible for the patron to remove and restore his vehicle at will during the period of which has been paid, without additional charge.

My new coin-actuated registering and metering device forming part of my invention is comparatively simple and compact. That portion of the device disposed towards the patron is practically fool-proof and consists of but a small number of parts. On the other hand, those parts and mechanism of the device which are at all complicated or delicate are protected from the patron, and are available only to the operator or attendant.

The device is sturdy, requires little supervision or maintenance, is readily repaired when for any reason it gets out of order, and is entirely reliable in operation.

I claim:

1. As a new article of manufacture, a recorder comprising, in combination, means defining a window, a closure for said window, a paper record strip, a feed mechanism for passing said paper strip step by step across said window in successive cycles of operation, a time stamp, and a coin stamp for imprinting the amount and value of deposited coins, both stamps being positioned so as, when brought into operation, to make imprint in each cycle on said record strip when the latter is stationary, a coin-operated releasing means for opening said window closure to open said window, for operating the said coin stamp, and to cause the latter to print on the record strip the amount of coins deposited in that particular operation, means operable as an incident to each cycle of operations for operating said time stamp to cause it to print on the record strip once in each cycle, and manual means released for operation by said coin-operated means for closing said closure across said window, for actuating said paper feed mechanism, and for conditioning the recorder for the next entry.

2. As a new article of manufacture, a recorder comprising, in combination, means defining a window, a closure for said window, a paper record strip, a feed mechanism for passing said paper strip step by step across said window in successive cycles of operation, a time stamp, and a coin stamp for imprinting the amount and value of deposited coins, both stamps being positioned so as, when brought into operation, to make imprint in each cycle on said record strip when the latter is stationary, a coin-operated releasing means for opening said window closure, to open said window, and for operating said coin stamp, and to cause the latter to print on the record strip the amount of coins deposited in that particular operation, and manual means released for operation by said coin-operated means, to close said closure across said window, to cause said time stamp to make imprint on said record strip, to actuate said paper feed mechanism, and to condition the recorder for the next entry.

3. A coin-actuated metering and registering device for use with parking lots, comprising a frame, a slidable window in the front of said frame for closing and opening a window opening, said window normally being latched in a closed position, means for biasing the window in the direction of the opening, a record strip movable across said frame past said window opening, means for moving said record strip step-by-step, coin slides carried by said frame, number stamps actuated by said slides when the latter are seated home to imprint on said record strip the value of the coins deposited, means actuated upon seating of said slides for releasing said window whereupon the latter is moved to expose the window opening, time-stamping means, and an actuating lever operable upon seating of said coin slides to seat the time-stamping means on the record strip, to close and re-latch the window, and to advance the record strip by one step, to present a new working field thereon.

4. A coin-actuated metering and registering device comprising a frame, a window opening being provided in the front of said frame, a window slidable across said opening, means for normally latching said window in closed position, means for biasing the window in the direction of opening, a record strip movable across said window opening, means for moving said strip step-by-step, coin slides mounted in the front of said frame, coin tubes depending from said frame to receive coins deposited in said slides when the latter are seated home, number stamps actuated by said slides to imprint on said strip the value of the coins deposited, means actuated by said coin slides, when the latter are seated home, for releasing said window latch means, whereby to expose the window opening, a take-up reel, marking means chained to said reel, means biasing said marking means to unwind said reel to eject the marking means through said opening when the latter is exposed, time-stamping means, an actuating lever released for operation upon seating of said coin slides, gearing interconnecting said reel and said actuating lever, linkage interconnecting said actuating lever and said time-stamping means, linkage interconnecting said actuating lever and said strip-advancing means, and means transmitting the movement of the actuating lever to the window, whereupon actuation of said actuating lever causes the marking means to be wound up against said reel, the time-stamp to seat against the record strip, the window to be closed and re-latched, and the strip to be advanced in step-by-step manner.

5. In a time metering and registering device having a frame and an actuating lever swingable through a vertical angle and fast to a shaft and normally locked against operation, a coin slide, a releasing coupler operated upon seating home of said coin slide to release said actuating lever, a gear quadrant fast on said shaft, a take-up reel, a housing for said reel on said frame, a shaft in said housing on which said reel is journalled, a pinion on said last-mentioned shaft meshing with said gear, a chain on said reel, and a marking device on the free end of said chain, movement of said lever in a working direction causing said reel to be wound up.

6. In a time metering and registering device having a frame and an actuating lever swingable through a vertical angle and fast to a shaft and normally locked against operation, a coin slide, a releasing coupler operated upon seating home of said coin slide to release said actuating lever, a gear quadrant fast on said shaft, a take-up reel, a housing for said reel on said frame, a shaft in said housing on which said reel is journalled, a pinion on said last-mentioned shaft meshing with said gear, a chain on said reel, a marking device on the free end of said chain, and a tension spring fast at one end to said frame and associated at its other end with said chain, to bias the latter in an unwinding direction when the chain is wound up on the reel.

7. In a coin-actuated metering and registering device, a frame, coin slides disposed in the front of the frame and adapted to seat home therein, a window slidable in the frame and normally closing a window opening, latches for said window, a spring biasing said window into position to expose said opening, and a releasing coupler pivotally disposed rearwardly of said coin slides, seating home of any coin slide actuating the releasing coupler to unseat said latches from the window, whereupon the spring pulls the window into position to expose the window opening.

8. In a coin-actuated metering and registering device having a record strip; a frame, coin slides for different denominations of coins disposed in the front of said frame and adapted to seat home therein, a rocker arm shaft disposed transversely across said frame, rocker arms corresponding in number to the number of coin slides fast at their apices on said shaft, linkages interconnecting said slides and the corresponding rocker arms, number stamps corresponding one to each slide, and each having a frame, a projecting spindle on the movable part of each stamp, and a spring interconnecting the free end of each rocker arm and the spindle of the corresponding stamp, whereby upon seating home the given coin slide, the corresponding stamp is actuated to make an impression on the associated record strip.

9. In a coin-actuated time metering and registering device having a frame, coin slides carried in said frame, a window normally closing a window opening in said frame, a record strip, and means for advancing said record strip step-by-step across said window; the structure comprising upper time clock guides disposed one on each side of said frame and pivotally disposed for rocking relative thereto about pivots disposed at the bottom rear of said guides, said guides having longitudinal slots therein, a guide shaft extending between said guides and movable and swingable in said slots, lower guides provided in said frame for said time clock, for normally restraining the latter in operation to rectilinear motion, an actuating lever, a shaft journalled in said frame, to which shaft said actuating lever is fast, bell crank levers fast on said shaft, and links interconnecting said bell crank levers and said guide shaft, so that upon operation of said lever, the time clock is moved rectilinearly against the corresponding registering strip and leaves a time imprint thereon.

10. In a coin-actuated time metering and registering device having a frame, coin slides carried in said frame, a window normally covering a window opening, a registering strip and means for advancing said registering strip step-by-step across said window; the structure comprising a time clock, upper time clock guides having longitudinal slots therein, disposed one on each side of and pivotally secured to said frame for rocking relative thereto about pivots disposed at the bottom rear of said guides, a guide shaft movable and swingable in said slots and carrying said time clock, lower guides fast to said frame for restraining the clock, during operation, to rectilinear motion, an actuating lever, a shaft to which said actuating lever is fast, bell-crank levers fast on the same shaft, and links interconnecting said bell crank levers and said guide shaft at opposite ends of the latter, so that upon operation of said actuating lever the time clock is moved rectilinearly against the cooperating registering strip and makes an impression thereon.

11. In a coin-actuated time metering and registering device, a frame including a front member, coin-actuated slides, a shaft extending transversely across said frame and journalled for rotation therein, an actuating lever projecting exteriorly from said front member and fast to said shaft, a releasing coupler pivoted to said frame and movable by said coin slides when the latter are seated home, bell-crank levers fast on said shaft on opposite sides of the frame and resting against said releasing coupler, a segmental rack fast to said frame, adjacent one said lever, and a spring-pressed dog carried by said lever and engaging the teeth of said rack, said rack having deepened depressions at the ends of the operable travel of the working end of said actuating lever along said rack, into which said dog drops to change direction of camming, actuation of the coupler upon operation of a coin slide releasing the bell-crank levers so that the latter, together with the working end of the actuating lever, fall into the lower direction-changing position of the dog, whereupon the actuating lever can be operated through its working stroke.

12. In a coin-actuated time metering and registering device, a frame including a front member, coin-actuated slides, a shaft extending transversely across said frame and journalled for rotation therein, an actuating lever projecting exteriorly from said front member and fast to said shaft, a releasing coupler pivoted to said frame and movable by said coin slides when the latter are seated home, bell-crank levers fast on said shaft on opposite sides of the frame and resting against said releasing coupler, a segmental rack fast to said frame adjacent one said lever, and a spring-pressed dog carried by said lever and engaging the teeth of said rack, said rack having deepened depressions at the ends of the operable travel of the working end of said actuating lever along said rack, into which said dog drops to change direction of camming, actuation of the coupler upon operation of a coin slide releasing the bell-crank levers so that the latter, together with the working end of the actuating lever, fall into the lower direction-changing position of the dog, whereupon the actuating lever can be operated through its working stroke, a yoke member fast on said shaft and extending rearwardly thereof, and a tension spring fast at one end of said frame and at its other end to said yoke member, to restore the mechanism to its rest position upon release of said actuating lever.

13. In a coin-actuated time metering and registering device having a frame, a window movable across the front of said frame to expose a window opening, and a record strip movable across said window opening; the structure comprising a main feed roll journalled in said frame, an actuating pressure feed roll spring-pressed strongly against the main roll, a ratchet wheel fast to said main roll, a pawl cooperating with said ratchet wheel for advancing the same step-by-step in one direction and for slipping the wheel in the other direction of movement, a feed roll-actuating lever pivoted at one end to said frame and constrained at its other end to swing through a rectilinear path, a main actuating lever, a yoke movable by said main actuating lever, and means interconnecting said yoke and said feed roll actuating lever for moving the latter to advance the main roll upon operation of the main lever, the paper strip being positioned between the said rolls.

14. In a coin-actuated time metering and registering device having a frame, a window movable across the front of said frame to expose a window opening, and a record strip movable across said window opening; the structure comprising a main feed roll journalled in said frame, an actuating pressure feed roll spring-pressed strongly against the main roll, a ratchet wheel fast to said main roll, a pawl cooperating with said ratchet wheel for advancing the same step-by-step in one direction and for slipping the wheel in the other direction of movement, means defining a vertical guide slot disposed on the rear side of the front of said frame, a feed roll-actuating lever pivoted at one end to said frame and having its forward, free end received in said slot, it thereby being constrained to swinging through a vertical linear path, a main actuating lever, a yoke movable by said main actuating lever, a depending stirrup pivotally suspended from said yoke and engaging about said feed roll-actuating lever in anti-friction manner for aiding in swinging the latter through a vertical angle, and a spring connected at one end to said frame and at its other end to a lever associated with said pawl, for biasing the free end of the feed roll-actuating lever and for participating, along with said stirrup, in advancing the main roll upon operation of the main lever, the paper strip being positioned between said two main rolls.

15. In a coin-actuating time metering and registering device, a frame, a window in said frame, a record strip mounted in said frame, means for moving said record strip step-by-step across said window, said means including a lever arcuate along a portion of its extent and straight for the remainder of such extent, a printer carried by said frame and adapted to print on a stationary field of said record strip, a main actuating shaft, coin slides in said frame, a releasing coupler normally holding such shaft against rotation in an operable direction but releasing it upon seating home of any coin slide, and means between said main actuating shaft and said lever movable, during the initial rotation of the rotatable shaft, only for a limited extent along the linear portion of said lever, whereby the latter is not actuated during such initial rotation, and the record strip remains stationary under the printer, so that the latter makes a sharp impression thereon, free of blur.

ROY E. WHITMORE.